United States Patent [19]
Nagaoka

[11] Patent Number: 5,627,682
[45] Date of Patent: May 6, 1997

[54] ZOOM LENS SYSTEM

[75] Inventor: Toshiyuki Nagaoka, Tokyo, Japan

[73] Assignee: Olympus Optical Co., Ltd., Tokyo, Japan

[21] Appl. No.: 355,176

[22] Filed: Dec. 8, 1994

[30] Foreign Application Priority Data

Dec. 9, 1993 [JP] Japan .................................. 5-340353

[51] Int. Cl.$^6$ .................................................. G02B 15/14
[52] U.S. Cl. ........................... 359/688; 359/775; 359/690
[58] Field of Search ................................ 359/683, 688, 359/689, 690, 772, 775, 776, 784, 785, 787

[56] References Cited

U.S. PATENT DOCUMENTS 3,922,070  11/1975  Macher ........................ 359/688
4,135,786   1/1979  Ikemori ....................... 359/688

FOREIGN PATENT DOCUMENTS 57-53718  3/1982  Japan .
60-11812  1/1985  Japan .
63-34505  2/1988  Japan .

*Primary Examiner*—Georgia Y. Epps
*Assistant Examiner*—Dawn-Marie Bey
*Attorney, Agent, or Firm*—Cushman, Darby & Cushman IP Group of Pillsbury Madison & Sutro LLP

[57] ABSTRACT

A zoom lens system comprising, in order from the object side, a first lens unit which has a positive refractive power and is to be kept stationary for zooming the lens system, a second lens unit which has a negative refractive power and is movable for zooming said lens system, and a third lens unit which has a positive refractive power and is to be kept stationary for zooming the lens system: the second lens unit consisting of a front subunit having a negative refractive power and a rear subunit having a negative refractive power. The zoom lens system is configured so as to corect a deviation of an image location by varying, during zooming, an airspace reserved between the front subinit and the rear subunit.

15 Claims, 16 Drawing Sheets

SPHERICAL ABERRATION
F/2.00

ASTIGMATISM
ω 26.0°

DISTORTION
ω 26.0°

LATERAL CHROMATIC ABERRATION
ω 26.0°

OFFAXIAL LATERAL ABERRATION
ω 18.9°

SPHERICAL ABERRATION
F/2.00

ASTIGMATISM
ω 11.4°

DISTORTION
ω 11.4°

LATERAL CHROMATIC ABERRATION
ω 11.4°

OFFAXIAL LATERAL ABERRATION
ω 8.0°

SPHERICAL ABERRATION
F/2.00

ASTIGMATISM
ω 4.8°

DISTORTION
ω 4.8°

LATERAL CHROMATIC ABERRATION
ω 4.8°

OFFAXIAL LATERAL ABERRATION
ω 3.4°

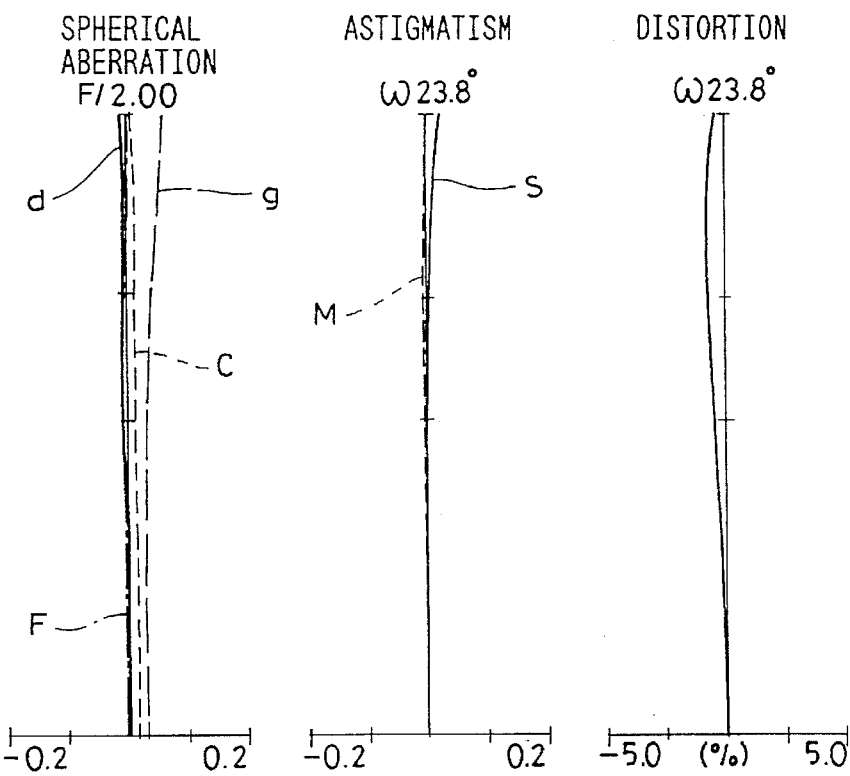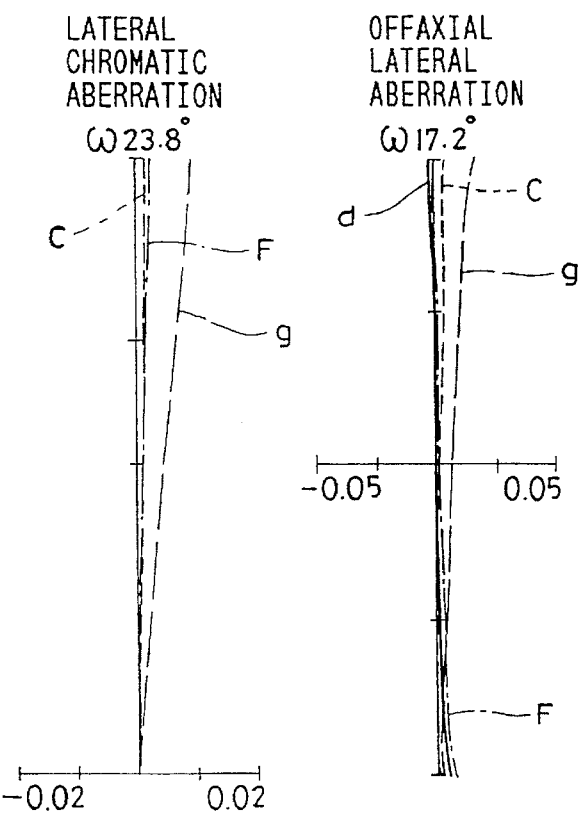

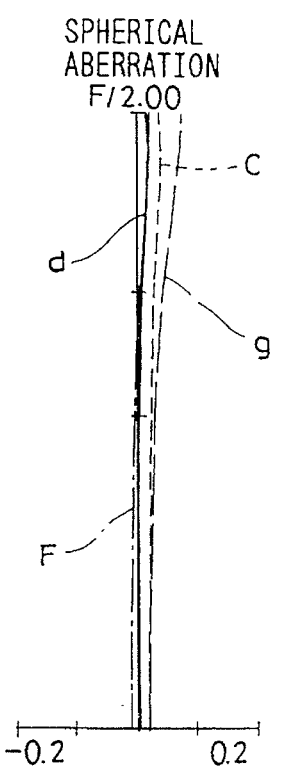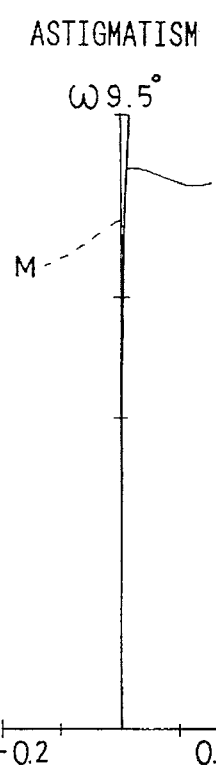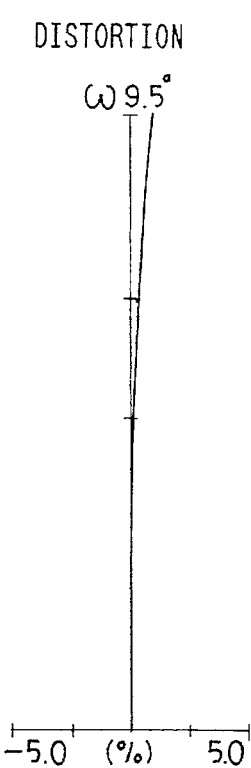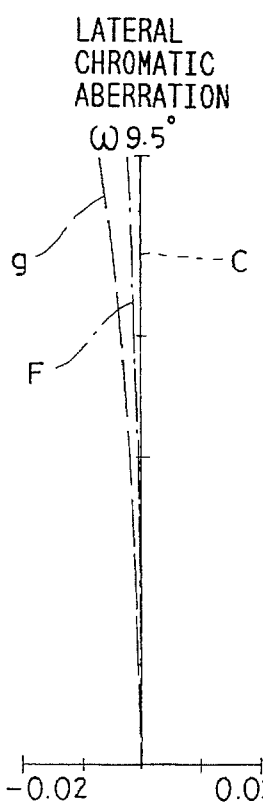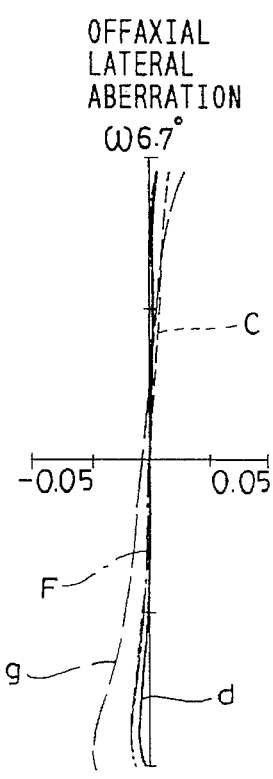

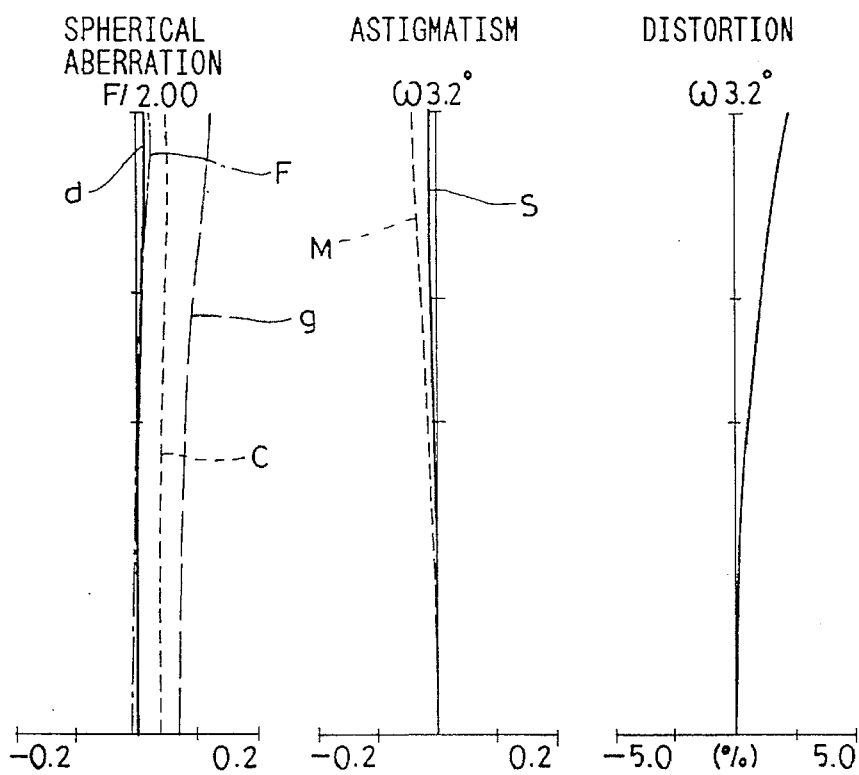
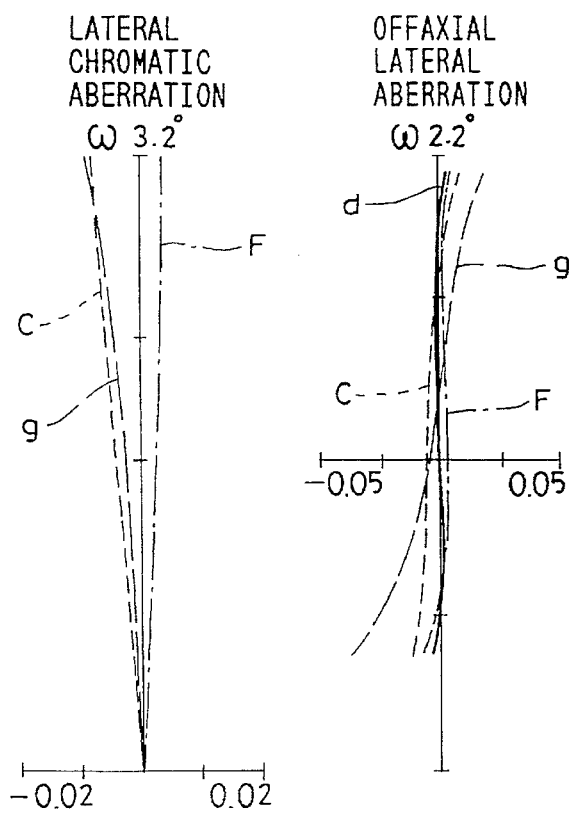

SPHERICAL
ABERRATION
F/2.00

ASTIGMATISM
ω 24.0°

DISTORTION
ω 24.0°

LATERAL
CHROMATIC
ABERRATION
ω 24.0°

OFFAXIAL
LATERAL
ABERRATION
ω 17.3°

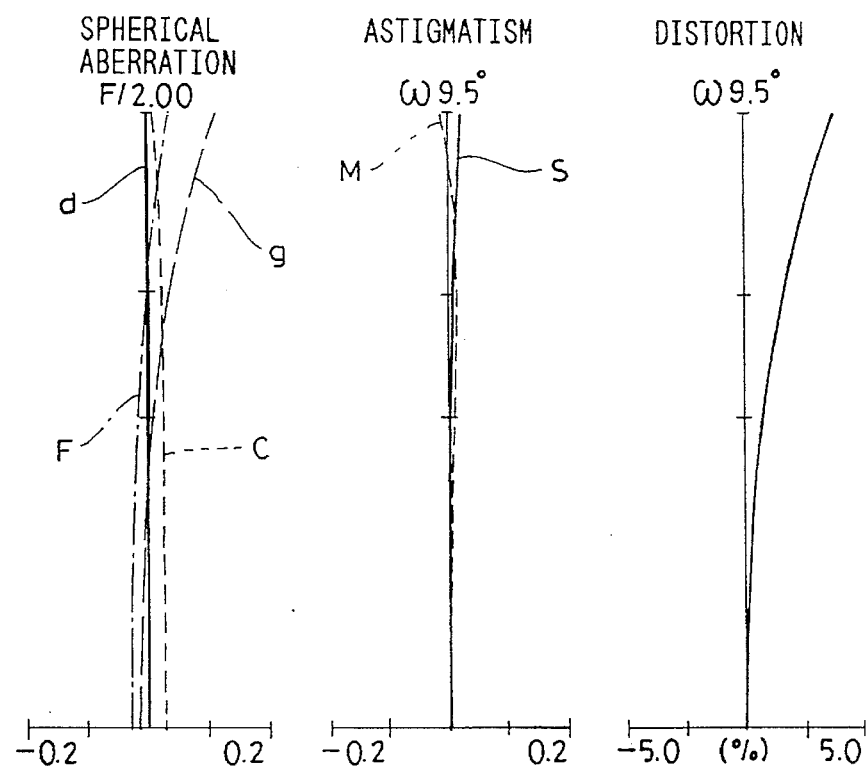

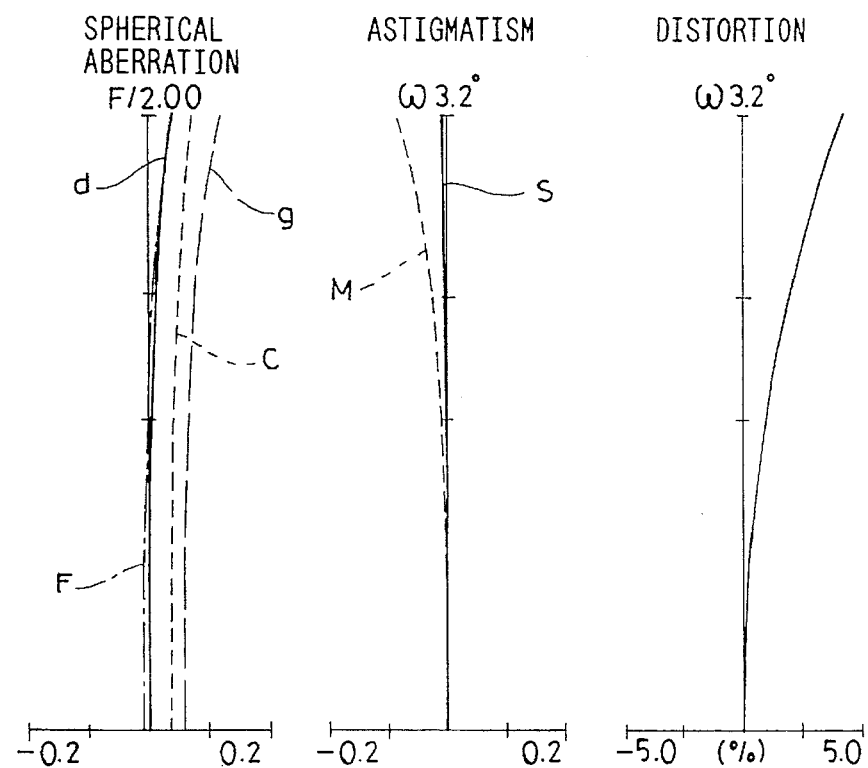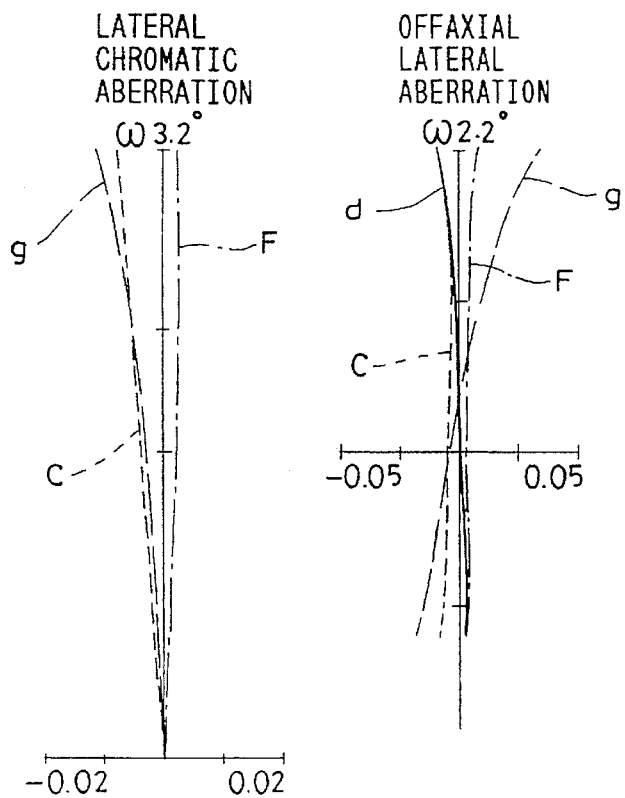

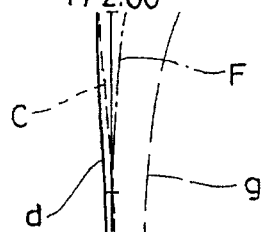
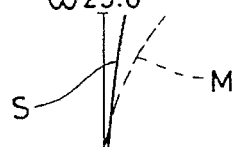
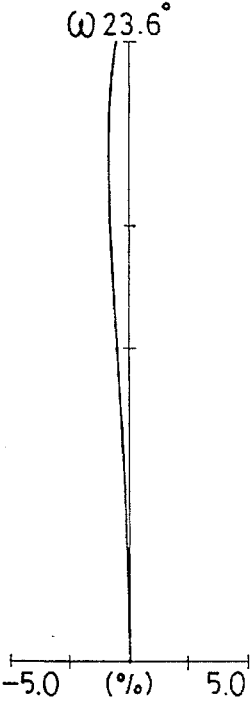
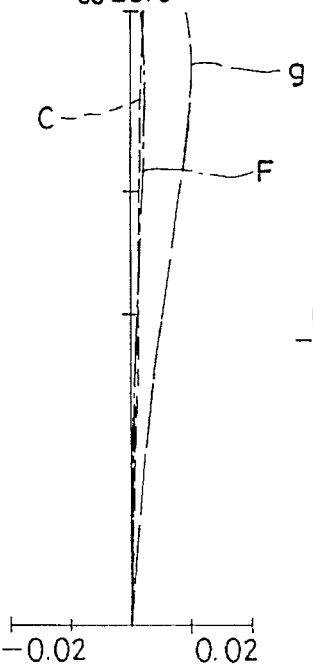
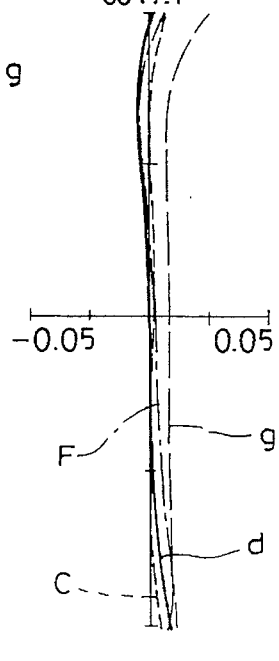

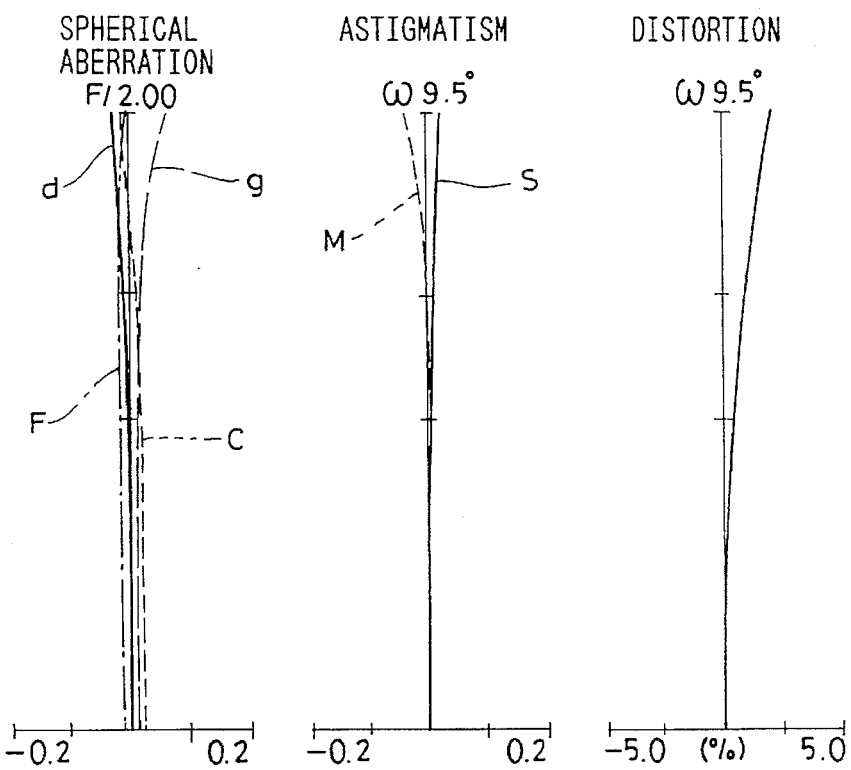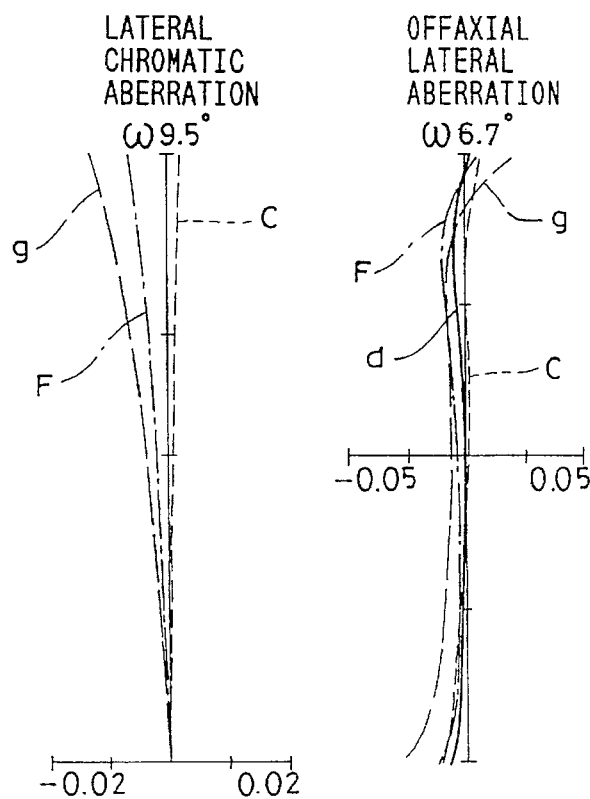

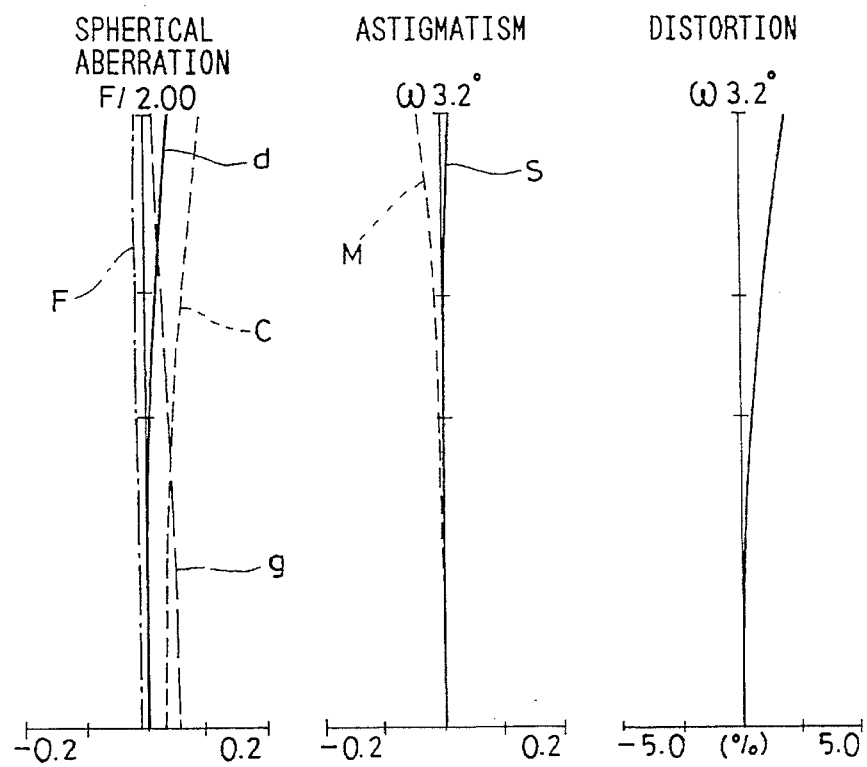

ZOOM LENS SYSTEM

BACKGROUND OF THE INVENTION a) Field of the Invention

The present invention relates to a zoom lens system which is suited for use with silver salt cameras and video cameras, and has a high vari-focal ratio.

b) Description of the Prior Art

It has conventionally been requested for photographic lens systems which are to be used with silver salt cameras, video cameras and so on to have high vari-focal ratios, compact sizes and high optical performance. As conventional examples of photographic lens systems which are configured so as to meet these requirements, there are known the zoom lens systems disclosed by Japanese Patents kokai Publication No. Sho 63-34,505, Kokai Publication No. Sho 60-11, 812 and Kokai Publication No. Sho 57-53,718. For obtaining a zoom lens system which can meet the above-mentioned requirements like the zoom lens system disclosed by these patents, it is conceivable to compose a zoom lens system, in order from the object side: of a first lens unit $G_1$ which is to be kept stationary for zooming the lens system and has a positive refractive power; a second lens unit $G_2$ which is referred to as a variator movable for zooming and having a vari-focal function, and has a negative refractive power; a third lens unit $G_3$ which is referred to as a compensator movable for zooming and having a function to maintain an image surface at a constant location, and has a negative refractive power; and a fourth lens unit $G_4$ which is to be kept stationary for zooming and has a positive refractive power. As a measure for configuring such a zoom lens system so as to have a short total length, it is known to strengthen the refractive power of the variator so as to shorten a distance for which this lens unit is to be moved for zooming the lens system. When the refractive power of the variator is strengthened, however, this lens unit produces aberrations in larger amounts which can hardly be corrected by itself.

For reducing variations of aberrations to be caused by zooming, it is generally desirable to correct aberrations in each of lens units which are used for composing a zoom lens system. From this viewpoint only, a large number of lens elements must be disposed in the variator for configuring a zoom lens system of the type illustrated in FIG. 1 so as to be compact and have high optical performance by strengthening the refractive power of the variator. However, such disposition of a large number of lens element in this lens unit is undesirable for configuring the zoom lens system compact. Though it is conceivable to use an aspherical surface or aspherical surfaces in the variator for favorably correcting aberrations without increasing a number of lens elements to be disposed in this lens unit, chromatic aberration cannot be corrected even when an aspherical surface or aspherical surfaces are used in the variator.

SUMMARY OF THE INVENTION

A primary object of the present invention is to provide a compact zoom lens system which is suited for use with silver salt cameras, video cameras, etc., and has high optical performance including a high vari-focal ratio.

The zoom lens system according to the present invention comprises in order from the object side: a first lens unit which has a positive refractive power and is to be kept stationary for zooming; a second lens unit which has a negative refractive power and is movable for zooming the lens system; and a third lens unit which has a positive refractive power and is to be kept stationary for zooming: the second lens unit being composed of a front subunit having a negative refractive power and a rear subunit having a negative refractive power; and these subunits being disposed on both sides of an airspace which is to be varied for compensating a deviation of an image location while the second lens unit is moved for zooming. The zoom lens system according to the present invention is configured so as to satisfy the following conditions (1), (2) and (3):

$$0.1 < D_{2W}/D_{23W} < 2.0 \quad (b\ 1)$$

$$1.8 < |f_{2F}/f_W| < 4.0 \quad (2)$$

$$4.0 < f_1/f_W < 8.0 \quad (3)$$

wherein the reference symbol $D_{2W}$ represents the airspace reserved between the front subunit and the rear subunit of the second lens unit at a wide position of the zoom lens system, the reference symbol $D_{23W}$ designates an airspace reserved between the second lens unit and the third lens unit at the wide position, the reference symbol $f_{2F}$ denotes a focal length of the front subunit of the second lens unit, the reference symbol $f_1$ represents a focal length of the first lens unit, and the reference symbol $f_W$ designates a focal length of the zoom lens system as a whole at the wide position.

For obtaining a compact zoom lens system having high optical performance, it is required not only to strengthen a refractive power of a variator which is movable for zooming and has a vari-focal function but also to favorably correct aberrations produced by the variator. For meeting these requirements, it is preferable to compose the variator of a front subunit having a negative refractive power and a rear subunit having a negative refractive power, zoom the lens system by varying an airspace reserved between the front subunit and the rear subunit used for composing the variator, and perform a change of magnification and compensation of a deviation of an image surface location at the same time by moving the second lens unit along an optical axis during the zooming.

FIG. 2 shows a diagram illustrating a fundamental composition of the zoom lens system according to the present invention in a condition where it is set at the wide position thereof. In this drawing, the reference symbol $G_1$ represents the first lens unit, the reference symbol $G_2$ designates the second lens unit and the reference symbol $G_3$ denotes the third lens unit: the second lens unit consisting of a front subunit $G_{2F}$ and a rear subunit $G_{2R}$. Further, the reference symbol $D_{12W}$ represents the airspace reserved between the first lens unit $G_1$ and the second lens unit $G_2$ when the zoom lens system is focused on an infinite object distance at the wide position therof, the reference symbol $D_{2W}$ denotes the airspace reserved between the front subunit and the rear subunit of the second variator lens unit $G_2$ when the zoom lens system is focused on the infinite object distance at the wide position, and the reference symbol $D_{23W}$ represents an airspace reserved between the second lens unit (variator) $G_2$ and the third lens unit $G_3$ when the zoom lens system is focused on the infinite object distance at the wide position.

Owing to the facts that the variator (second lens unit) is composed of the front subunit and the rear subunit, and that a change of magnification and correction of the deviation of the image location caused by the change of magnification are performed, along with zooming, by varying the airspace reserved between these subunits and moving the second lnes unit along the optical axis, the zoom lens system having the fundamental composition described above makes it possible to impart, to the variator (second lens unit) disposed therein, a refractive power which is stronger than that of the variator used in the conventional zoom lens system illustrated in FIG. 1 while favorably correcting aberrations produced by the variator (second lens unit).

The zoom lens system of the conventional type shown in FIG. 1 will be compared with the zoom lens system according to the present invention on assumptions that the variators used in these zoom lens systems have the same refractive power and that both the zoom lens systems are composed of thin lens elements. The refractive powers of the variators used in both the zoom lens systems are in relationship expressed by the following formula (a):

$$\phi = \phi_F + \phi_R - \phi_F \phi_R d \quad (a)$$

wherein the reference symbol $\phi$ represents the refractive power of the variator used in the zoom lens system of the conventional type, the reference symbols $\phi_F$ and $\phi_R$ designate refractive powers of the front subunit and the rear subunit respectively which are used for composing the variator used in the zoom lens system according to the present invention, and the reference symbol d denotes the airspace reserved between the front subunit and the rear subunit.

FIG. 3 shows relationship between $\phi_F$ and $\phi_R$ which was obtained by varying d so as to have values of $k_1, k_2, \ldots k_{n+1}$ in the above-mentioned formula (a). In this case, $\phi$, $\phi^F$ and $\phi_R$ have the same positive or negative sign, and $k_n$ is a real number which has a positive value within a range of $0 < k_{n < kn+1}$ (n=1, 2, . . . , n).

It will be understood from FIG. 3 that the variator (second lens unit $G_2$) of the zoom lens system according to the present invention shown in FIG. 2 allows to select smaller values for $\phi_F$ and $\phi_R$ by selecting a larger value for k, or d than the value of k, or d which is allowed by the variator of the type shown in FIG. 1 having a refractive power which is the same as that of the variator used in the zoom lens system according to the present invention. That is to say, the present invention makes it possible to share a refractive power required for the change of magnification between the front subunit $G_{2F}$ and the rear subunit $G_{2R}$ of the variator (second lens unit), whereby the variator (second lens unit) produces aberrations in amounts smaller than those of aberrations produced by the variator used in the zoom lens system of the type shown in FIG. 1. Accordingly, the present invention makes it possible to select a stronger refractive power for the variator (second lens unit) than that of the variator of the zoom lens system of the type shown in FIG. 1 while favorably correcting aberrations.

Further, in the zoom lens system according to the present invention, the role of the compensator to correct the deviation of the image location is allocated to the variator (second lens unit) by adequately varying, along with zooming, the airspace reserved between the front subunit and the rear subunit of the variator. In other words, the zoom lens system according to the present invention requires no lens unit that has the function of the compensator, unlike the zoom lens system of the conventional type shown in FIG. 1.

In the zoom lens system according to the present invention, the variator (second lens unit) comprises a large number of lens elements since the variator (second lens unit) consists of the front subunit and the rear subunit. However, the zoom lens system according to the present invention as a whole does not comprise a larger number of lens elements since the lens system does not require the compensator which is used in the zoom lens system of the type shown in FIG. 1. That is to say, the present invention has made it possible to shorten the total length of the conventional zoom lens system while favorably correcting aberrations without increasing the number of the lens elements disposed in the conventional zoom lens system.

Furthermore, the zoom lens system according to the present invention allows, as seen from FIG. 3, to further weaken the refractive powers $\phi_F$ and $\phi_R$ of the front subunit and the rear subunit when the airspace reserved between the front subunit and the rear subunit of the variator (second lens unit) is widened. When the airspace reserved between the front subunit and the rear subunit of the variator (second lens unit) is widened extremely, however, rays emerging from the front subunit are incident high on the rear subunit at the wide position in particular, whereby the rear subunit produces positive spherical aberration in a large amount which can hardly be corrected in the rear subunit, and spherical aberration is remarkably varied by the chance of magnification at the wide position and the tele position of the zoom lens system. For this reason, it is necessary to select an adequate value for the airspace $D_{2W}$ or satisfy the above-mentioned condition (1) so that the refractive powers of the front subunit and the rear subunit of the variator (second lens unit) are maintaied at values favorable for correction of aberrations.

By configuring the zoom lens system according to the present invention so as to satisfy the condition (1), it is possible to select, for the refractive powers of the front subunit and the rear subunit of the variator (second lens unit)as well as the airspace reserved therebetween, values which are suited for shortening the total length of the zoom lens system as a whole favorably correcting aberrations produced by the variator (second lens unit).

If the lower limit of 0.1 of the condition (1) is exceeded, it will be insignificant to divide the variator (second lens unit) into the front subunit and the rear subunit, and strong refractive powers must be imparted to the front subunit and the rear subunit as is understood from FIG. 3, there by making it difficult to correct aberrations produced by the variator (second lens unit) in the second lens unit. If the upper limit of 2.0 of the condition (1) is exceeded, in contrast, the airspace reserved between the front subunit and the rear subunit of the variator (second lens unit) will be widened, thereby making it difficult to shorten the total length of the zoom lens system as a whole and correct spherical aberration favorably.

When the zoom lens system according to the present invention is configured so as to satisfy the condition (1), the lens system allows to strengthen the refractive powers of the variator (second lens unit) while favorably correcting aberrations. Further, it is undesirable for effective correction of aberrations produced by the variator (second lens unit) that the front subunit has a refractive power which is extremely different from a refractive power of the rear subunit. This will be described with reference to FIG. 3. Values of $\phi_F$ and $\phi_R$ which satisfy the formula (a) for a given value of $D_{2W}$ vary along one of the curves illustrated in FIG. 3. As is judged from this curve, values of $\phi_F$ and $\phi_R$ are minimum when they have a common value of $\phi/2$. When $\phi_F$ is nearly equal to $\phi$, for example, $\phi_R$ has a value nearly equal to 0, whereby it is impossible to effectively share the refractive power required for the change of magnification between the front subunit and the rear subunit of the variator (second lens unit), and the front subunit undesirably produces aberrations in large amounts.

For this reason, the present invention defines the refractive power of the front subunit of the variator (second lens unit) so as to satisfy the above-mentioned condition (2).

When the condition (2) is satisfied, the front subunit and the rear subunit of the variator (second lens unit) have refractive powers desirable for correction of aberrations. If the lower limit of 1.8 of the condition (2) is exceeded, the front subunit of the variator (second lens unit) will have a refractive power too strong for a refractive power of the rear subunit, thereby making it difficult to correct aberrations favorably. If the upper limit of 4.0 of the condition (2) is exceeded, in contrast, the rear subunit will have a refractive power too strong for a refractive power of the front subunit, thereby making it difficult to correct aberrations favorably.

The zoom lens system according to the present invention which is configured so as to satisfy the above-mentioned conditions (1) and (2) can correct aberrations when the variator (second lens unit) has a strengthened refractive power. For shortening the total length of the zoom lens system as a whole while favorably correcting aberrations, however, it is desirable that the first positive lens unit has an adequate refractive power.

The first lens unit has a function to converge a light bundle coming from an axial object point and another function to lead a light bundle coming from an offaxial object point to the second lens unit. Selection of a strong refractive power for the first lens unit is advantageous for shortening the total length of the zoom lens system, but allows the first lens unit to produce aberrations in large amounts, thereby making it difficult to correct the aberrations produced in the first lens unit. In particular, chromatic aberration can hardly be corrected at the tele position at which rays are incident high on the first lens unit. It is desirable for correction of aberrations to configure the first lens unit so as to satisfy the condition (3).

By configuring the first lens unit so as to satisfy the condition (3), it is possible to select a strong refractive power for the first lens unit while favorably correcting aberrations produced in the first lens unit, thereby making it possible to shorten the total length of the zoom lens system. If the first lens unit has a focal length exceeding the lower limit of 4.0 of the condition (3), it will be difficult to favorably correct aberrations produced in the first lens unit, chromatic aberration at the tele position in particular. If the upper limit of 8.0 of the condition (3) is exceeded, in contrast, the first lens unit will have a weak refractive power, thereby making it impossible to configure the zoom lens system compact.

In the next place, the object of the present invention can be accomplished also by configuring the zoom lens system according to the present invention as described below. Speaking concretely, the object of the present invention can be accomplished by: composing a zoom lens system, in order from the object side, of a first lens unit having a positive refractive power, a second lens unit having a negative refractive power and lens unit or lens units disposed thereafter; composing the first lens unit of at least three positive lens elements and at least one negative lens element; composing the second lens unit of a front subunit having a negative refractive power and a rear subunit having a negative refractive power; configuring the zoom lens system so as to perform zooming and correction of a deviation of an image location caused due to zooming by moving the second lens unit along an optical axis while varying an airspace reserved between the front subunit and the rear subunit; composing the front subunit of the second lens unit of at least one positive lens element and two negative lens elements; and configuring the zoom lens system so as to satisfy the following condition (1):

$$0.1 < D_{2W}/D_{23W} < 2.0 \qquad (1)$$

wherein the reference symbol $D_{2W}$ represents the airspace reserved between the front subunit and the rear subunit of the second lens unit at a wide position of the zoom lens system, and the reference symbol $D_{23W}$ designates an airspace reserved between the second lens unit and the third lens unit at the wide position.

A compact zoom lens system having high optical performance can be obtained as described above by composing a lens system of a first positive lens unit, a second lens unit and a subsequent lens unit or lens units, composing a second lens unit of a negative front subunit and a negative rear subunit, and configuring the lens system so as to be zoomed and correct a deviation of an image surface caused due to zooming by moving the second lens unit along an optical axis while varying an airspace reserved between the front subunit and the rear subunit thereof, and so as to satisfy the condition (1). Optical performance of this zoom lens system can be made higher by composing the first lens unit of at least three positive lens elements and at least one negative lens element, and composing the front subunit of the second lens unit of at least one positive lens element and two negative lens elements.

Since heights of axial and offaxial rays incident on the first lens unit and the second lens unit are remarkably different between the wide position and the tele position of the zoom lens system according to the present invention which has a high vari-focal ratio, the zoom lens system according to the present invention is apt to allow remarkable variations of aberrations to be caused by the change of magnification. For favorable correction of these variations of aberrations, it is necessary to correct aberrations by each of the lens units themselves. The first lens unit is apt to produce offaxial aberrations such as chromatic aberration and coma at the tele position of the zoom lens system in particular, and it is desirable for favorable correction of these aberrations that the first lens unit comprises at least three positive lens elements and at least one negative lens element. For correcting chromatic aberration, it is desirable to use at least one positive lens element and at least one negative lens element. For favorable correction of the offaxial aberrations such as coma, it is necessary to avoid abrupt deflection of rays within the first lens unit and it is desiarble for this reason to use at least three positive lens elements in the first lens unit. Further, it is difficult to correct chromatic aberration favorably without using a negative lens element. Further, it is difficult to correct the offaxial aberrations such as coma when two or a smaller number of positive lens elements are used in the first lens unit.

When the condition (1) is satisfied, it is possible to correct aberrations which are produced by strengthening the refractive power of the variator (second lens unit). In order to reduce the variations of aberrations to be caused by the change of magnification, it is necessary to favorably correct chromatic aberration and Patzval's sum which are produced by the front subunit of the second lens unit having the negative refractive power. For this reason, it is desirable to compose the front subunit of the second lens unit of at least one positive lens element and at least two negative lens elements. Though it is desirable for favorable correction of chromatic aberration and Petzval's sum to use at least one positive lens element and at least one negative lens element, it is preferable, in case of the zoom lens system according to the present invention which has the high vari-focal ratio, to use two negative lens elements in the front subunit of the second lens unit having the negative refractive power. If the front subunit of the second lens unit comprises no positive lens element or if this subunit uses one or no negative lens element, it will be difficult to correct chromatic aberration and Patzval's sum. If the front subunit of the second lens unit comprises three or more negative lens elements, the number of the negative lens elements will undesirably exceed the number of the lens elements required for correcting the aberrations.

Speaking to the rear subunit of the second lens unit on which heights of incident rays are varied less than those on the front subunit by zooming the lens system from the wide position to the tele position and which allows smaller variations of aberrations to be caused by the change of magnification, the rear subunit can be composed of lens elements in a number smaller than that of the lens elements used for composing the front subunit, or it is desirable to compose the rear subunit of at least one negative lens element.

In the zoom lens system according to the present invention in which the variator (seceond lens unit) has the refractive power strengthened for shortening the total length of the lens system, a diverging light bundle coming from the variator (second lens unit) is apt to be incident high on the lens unit or lens units disposed on the image side of the variator (second lens unit). The lens unit disposed on the image side of the variator (second lens unit) corresponds to the third lens unit in the zoom lens system according to the present invention illustrated, for example, in FIG. 3 or to the fourth lens unit in the conventional zoom lens system shown in FIG. 1. This lens unit has a function to converge the diverging light bundle coming from the variator (second lens unit). It is desirable for shortening the total lengths of these zoom lens systems to impart strong positive refractive powers to the lens units disposed on the image side of the variators so as to abruptly converge the diverging light bundles coming from the variators, but aberrations are produced in increased amounts when extremely strong refractive powers are imparted to these lens units. For this reason, it is desirable for the zoom lens system according to the present invention to configure the third lens unit so as to satisfy the following condition (4):

$$1.4 < f_3/f_W < 2.3 \qquad (4)$$

wherein the reference symbol $f_3$ represents a focal length of the third lens unit.

By configuring the third lens unit of the zoom lens system according to the present invention so as to satisfy the condition (4), it is possible to correct aberrations with good balance in the third lens unit and shorten the total length of the zoom lens system. If the lower limit of 1.4 of the condition (4) is exceeded, the third lens unit will have a strong refractive power, thereby making it difficult to favorably correct aberrations produced in this lens unit. If the upper limit of 2.3 of the condition (4) is exceeded, in contrast, it will be difficult to shorten the total length of the zoom lens system.

In the zoom lens system according to the present invention in which the variator has the refractive power strengthened for shortening the total length of the lens system, the diverging light bundle is apt to be incident high on the third lens unit and negative spherical aberration is apt to be produced in a large amount by the third lens unit which has the positive refractive power. It is desirable for the zoom lens system according to the present invention that the third lens unit not only satisfies the above-mentioned condition (4) but also comprises a lens element which has at least an aspherical surface having such a shape as to weaken a positive refractive power as portions of the aspherical surface are farther from the optical axis toward the margin thereof.

The aspherical surface to be used in the zoom lens system according to the present invention has a shape expressed by the following formula:

$$x = \frac{y^2/r}{1 + \sqrt{1 - (y/r)^2}} + \sum_{i=1}^{n} A_{2i} y^{2i}$$

wherein the optical axis is taken as the x axis, a direction perpendicular to the optical axis is taken as the y axis, the reference symbol r represents a radius of curvature on a portion of the aspherical surface located on the optical axis and the reference symbol $A_{2i}$ designates an aspherical surface coefficient.

It is possible to favorably correct the negative spherical aberration produced by the third lens unit by using, in the third lens unit, at least one lens element which has at least one aspherical surface having such a shape as to weaken a positive refractive power as portions of the aspherical surface are farther from the optical axis toward the margin thereof.

For the zoom lens system according to the present invention which is configured so as to moved the front subunit and the rear subunit of the second lens unit for the change of magnification and the correction of the deviation of the image location caused due to the change of magnification, it is desirable to focus the zoom lens system on an object located at an extremely short distance by moving the rear subunit of the second lens unit. The front subunit of the second lens unit has a function to refract light bundles coming from the axial and offaxial object points so as to travel in directions nearly in parallel with the optical axis. Accordingly, heights of rays and aberrations are varied little by moving the rear subunit of the second lens unit for focusing the zoom lens system on the object located at the extremely short distance. Further, it is desirable that the movable mechanisms such as a lens barrel for zoom lens systems have simple structures. Movable mechanisms having complicated structures are undesirable from viewpoints of manufacturing allowances and costs. For the zoom lens system according to the present invention in which only the second lens unit is movable but the first lens unit and the third lens unit are free from movable mechanisms, it is advantageous to focus the zoom lens system by moving the rear subunit of the second lens unit.

BRIEF DESCRIPTION OF THE DRAWINGS

FIG. 11A, FIG. 11B, FIG. 11C, FIG. 11D and FIG. 11E show curves illustrating aberration characteristics of a second embodiment of the present invention when it is focused on the object located at infinite distance at the wide position thereof;

FIG. 12A, FIG. 12B, FIG. 12C, FIG. 12D and FIG. 12E show curved illustrating aberration characteristics of the second embodiment of the present invention when it is focused on the object located at infinite distance at the intermediate focal length thereof;

FIG. 13A, FIG. 13B, FIG. 13C, FIG. 13D and FIG. 13E show curves illustrating aberration characteristics of the second embodiment of the present invention when it is focused on the object located at infinite distance at the tele position thereof;

FIG. 15A, FIG. 15B, FIG. 15C, FIG. 15D and FIG. 15E show graphs illustrating aberration characteristics of the third embodiment of the present invention when it is focused on the object located at infinite distance at the intermediate focal length thereof;

FIG. 16A, FIG. 16B, FIG. 16C, FIG. 16D and FIG. 16E show graphs illustrating aberration characteristics of the third embodiment of the present invention when it is focused on the object located at infinite distance at the tele position thereof;

FIG. 17A, FIG. 17B, FIG. 17C, FIG. 17D and FIG. 17E show curves visualizing aberration characteristics of a fourth embodiment of the present invention when it is focused on the object located at infinite distance at the wide position thereof;

FIG. 18A, FIG. 18B, FIG. 18C, FIG. 18D and FIG. 18E show curves visualizing aberration characteristics of the fourth embodiment of the present invention when it is focused on the object located at infinite distance at the intermediate focal length thereof; and FIG. 19A, FIG. 19B, FIG. 19C, FIG. 19D and FIG. 19E show curves visualizing aberration characteristics of the fourth embodiment of the present invention when it is focused on the object located at infinite distance at the tele position thereof.

DETAILED DESCRIPTION OF THE PREFERRED EMBODIMENTS

Figure 1:
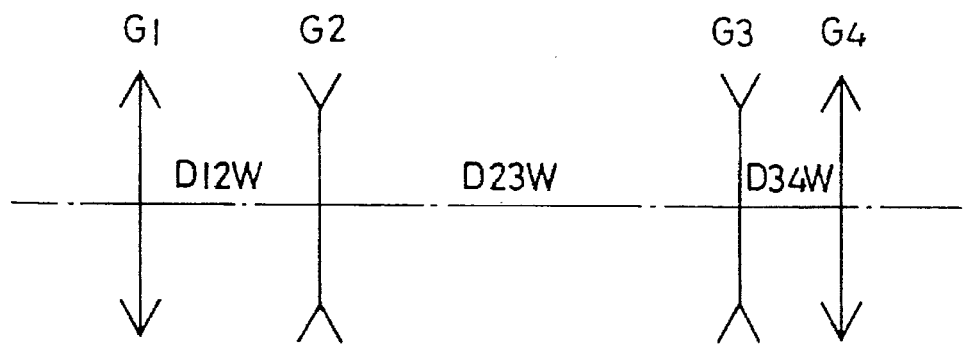
FIG. 1 shows a diagram illustrating a fundamental composition of the conventional zoom lens system.
Figure 2:
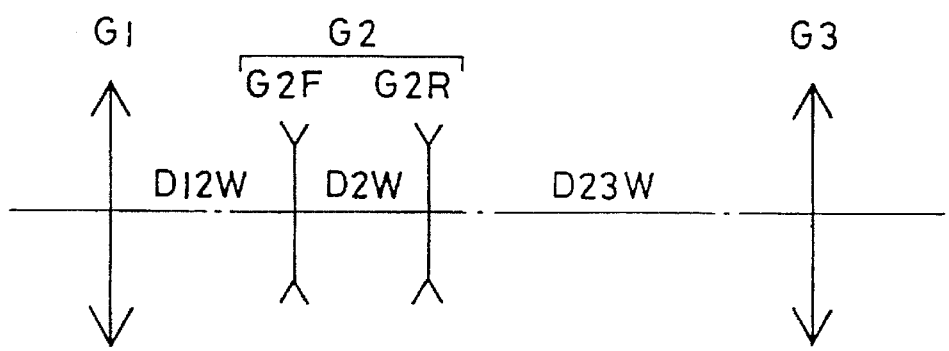
FIG. 2 shows a diagram illustrating a fundamental composition of the zoom lens system according to the present invention.
Figure 3:
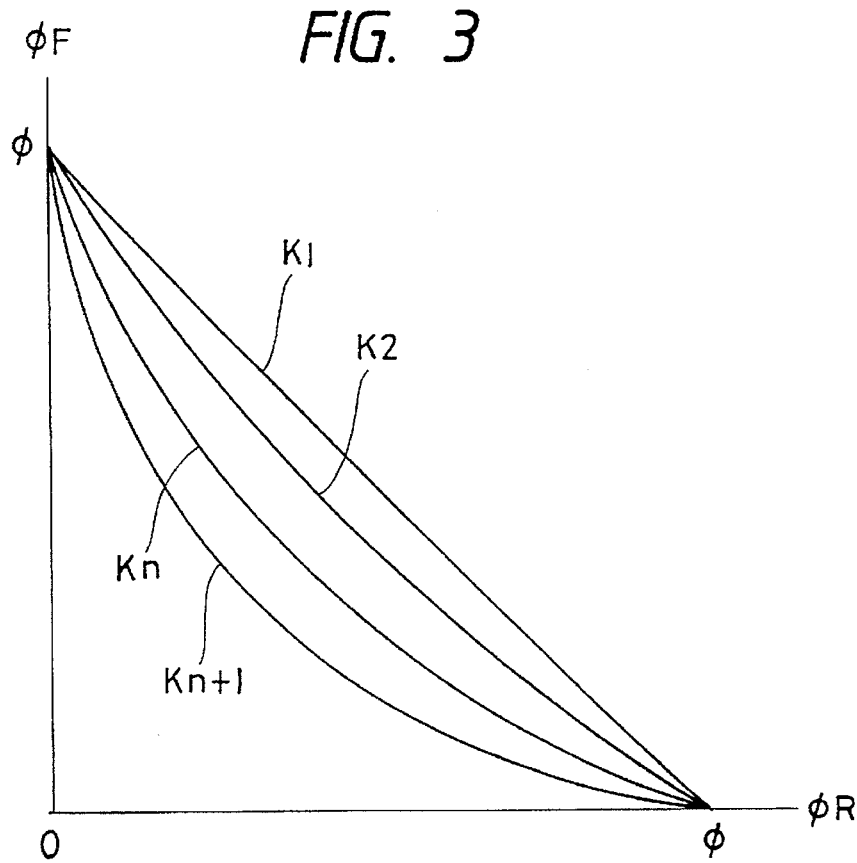
FIG. 3 shows graphs illustrating relationship of an airspace reserved between a front subunit and a rear subunit of a second lens unit versus refractive powers of these subunits for a given refractive power of the second lens unit.

Now, the zoom lens system according to the present invention will be described more detailedly below with reference to the preferred embodimetns thereof illustrated in the accompanying drawings and given in the form of the numerical data listed below:

Embodiment 1

| $f = 8.2 \sim 19.9 \sim 47.6$, F number = 2.0 | | | |
|---|---|---|---|
| $r_1 = 102.1880$ | | | |
| | $d_1 = 1.8000$ | $n_1 = 1.84666$ | $v_1 = 23.78$ |
| $r_2 = 51.8853$ | | | |
| | $d_2 = 5.9000$ | $n_2 = 1.48749$ | $v_2 = 70.20$ |
| $r_3 = -1535.8212$ | | | |
| | $d_3 = 0.1000$ | | |
| $r_4 = 49.2677$ | | | |
| | $d_4 = 5.0000$ | $n_3 = 1.49700$ | $v_3 = 81.61$ |
| $r_5 = 1888.7493$ | | | |
| | $d_5 = 0.1000$ | | |
| $r_6 = 28.7046$ | | | |
| | $d_6 = 5.0000$ | $n_4 = 1.49700$ | $v_4 = 81.61$ |
| $r_7 = 82.4830$ | | | |
| | $d_7 = D_1$ (variable) | | |
| $r_8 = 106.3574$ | | | |
| | $d_8 = 1.0000$ | $n_5 = 1.72600$ | $v_5 = 53.56$ |
| $r_9 = 9.5176$ | | | |
| | $d_9 = 5.0884$ | | |
| $r_{10} = -40.6272$ | | | |
| | $d_{10} = 1.0000$ | $n_6 = 1.72600$ | $v_6 = 53.56$ |
| $r_{11} = 26.9286$ | | | |
| | $d_{11} = 0.2000$ | | |
| $r_{12} = 17.5667$ | | | |
| | $d_{12} = 3.0000$ | $n_7 = 1.78470$ | $v_7 = 26.30$ |
| $r_{13} = -129.1473$ | | | |
| | $d_{13} = D_2$ (variable) | | |
| $r_{14} = -23.4685$ (aspherical surface) | | | |
| | $d_{14} = 1.0000$ | $n_8 = 1.49700$ | $v_8 = 81.61$ |
| $r_{15} = 53.6635$ | | | |
| | $d_{15} = D_3$ (variable) | | |
| $r_{16} = $ Stop | | | |
| | $d_{16} = 1.0000$ | | |
| $r_{17} = 10.8941$ | | | |
| | $d_{17} = 3.7165$ | $n_9 = 1.74100$ | $v_9 = 52.68$ |
| $r_{18} = -39.3388$ | | | |
| | $d_{18} = 0.8000$ | $n_{10} = 1.66680$ | $v_{10} = 33.04$ |
| $r_{19} = 22.5679$ | | | |
| | $d_{19} = 0.1000$ | | |
| $r_{20} = 13.9111$ (aspherical surface) | | | |
| | $d_{20} = 2.0007$ | $n_{11} = 1.61800$ | $v_{11} = 63.38$ |
| $r_{21} = 63.5195$ | | | |
| | $d_{21} = 2.6924$ | | |
| $r_{22} = -163.0838$ | | | |
| | $d_{22} = 1.1000$ | $n_{12} = 1.74000$ | $v_{12} = 28.29$ |
| $r_{23} = 8.3648$ (aspherical surface) | | | |
| | $d_{23} = 0.6817$ | | |
| $r_{24} = 12.0935$ | | | |
| | $d_{24} = 2.0000$ | $n_{13} = 1.74100$ | $v_{13} = 52.68$ |
| $r_{25} = -20.1060$ | | | |

| f | 8.2 | 19.9 | 47.6 |
|---|---|---|---|
| $D_1$ | 1.5 | 14.3594 | 20.9764 |
| $D_2$ | 12.6089 | 2.0003 | 5.7098 |
| $D_3$ | 13.7773 | 11.5265 | 1.2 | aspherical surface coefficient (14th surface)

$A_2 = 0$,  $A_4 = 0.19769 \times 10^{-4}$,  $A_6 = -0.58163 \times 10^{-8}$ (20th surface)

$A_2 = 0$,  $A_4 = -0.18948 \times 10^{-3}$,  $A_6 = -0.18455 \times 10^{-5}$

-continued (23rd surface)

$A_2 = 0$, $A_4 = 0.45379 \times 10^{-4}$, $A_6 = -0.31022 \times 10^{-5}$
$D_{2W}/D_{23W} = 0.9152$, $|f_{2F}/f_W| = 2.1096$, $f_1/f_W = 5.386$
$f_3/f_W = 1.688$

Embodiment 2

$f = 9.1 \sim 24.0 \sim 71.7$, F number = 2.0

| | | | |
|---|---|---|---|
| $r_1 = 87.5699$ | | | |
| | $d_1 = 1.9000$ | $n_1 = 1.84666$ | $\nu_1 = 23.78$ |
| $r_2 = 52.5224$ | | | |
| | $d_2 = 6.0000$ | $n_2 = 1.48749$ | $\nu_2 = 70.20$ |
| $r_3 = 286.3686$ | | | |
| | $d_3 = 0.1000$ | | |
| $r_4 = 55.0921$ | | | |
| | $d_4 = 5.2000$ | $n_3 = 1.49700$ | $\nu_3 = 81.61$ |
| $r_5 = -3155.7128$ | | | |
| | $d_5 = 0.1000$ | | |
| $r_6 = 34.6968$ | | | |
| | $d_6 = 4.1044$ | $n_4 = 1.49700$ | $\nu_4 = 81.61$ |
| $r_7 = 73.0856$ | | | |
| | $d_7 = D_1$ (variable) | | |
| $r_8 = 80.4134$ | | | |
| | $d_8 = 1.0000$ | $n_5 = 1.74100$ | $\nu_5 = 52.68$ |
| $r_9 = 12.1471$ | | | |
| | $d_9 = 5.1000$ | | |
| $r_{10} = -187.9869$ | | | |
| | $d_{10} = 1.0000$ | $n_6 = 1.74100$ | $\nu_6 = 52.68$ |
| $r_{11} = 26.8725$ | | | |
| | $d_{11} = 0.2000$ | | |
| $r_{12} = 18.9675$ | | | |
| | $d_{12} = 3.2042$ | $n_7 = 1.78472$ | $\nu_7 = 25.68$ |
| $r_{13} = 161.1782$ | | | |
| | $d_{13} = D_2$ (variable) | | |
| $r_{14} = -15.7363$ (aspherical surface) | | | |
| | $d_{14} = 1.0000$ | $n_8 = 1.49700$ | $\nu_8 = 81.61$ |
| $r_{15} = 45.3666$ | | | |
| | $d_{15} = 0.5000$ | | |
| $r_{16} = -211.5343$ | | | |
| | $d_{16} = 1.4000$ | $n_9 = 1.74077$ | $\nu_9 = 27.79$ |
| $r_{17} = -63.4673$ | | | |
| | $d_{17} = D_3$ (variable) | | |
| $r_{18} = $ stop | | | |
| | $d_{18} = 1.0000$ | | |
| $r_{19} = 13.5590$ (aspherical surface) | | | |
| | $d_{19} = 4.2000$ | $n_{10} = 1.61800$ | $\nu_{10} = 63.38$ |
| $r_{20} = -19.6267$ | | | |
| | $d_{20} = 0.8000$ | $n_{11} = 1.66680$ | $\nu_{11} = 33.04$ |
| $r_{21} = -143.1055$ | | | |
| | $d_{21} = 0.1000$ | | |
| $r_{22} = 16.4577$ (aspherical surface) | | | |
| | $d_{22} = 2.4876$ | $n_{12} = 1.61800$ | $\nu_{12} = 63.38$ |
| $r_{23} = -75.5136$ | | | |
| | $d_{23} = 0.1000$ | | |
| $r_{24} = 17.8448$ | | | |
| | $d_{24} = 1.3774$ | $n_{13} = 1.67270$ | $\nu_{13} = 32.10$ |
| $r_{25} = 8.6379$ (aspherical surface) | | | |
| | $d_{25} = 2.4661$ | | |
| $r_{26} = 30.3018$ | | | |
| | $d_{26} = 1.0000$ | $n_{14} = 1.78470$ | $\nu_{14} = 26.22$ |
| $r_{27} = 16.1955$ | | | |
| | $d_{27} = 2.4980$ | | |
| $r_{28} = -87.9256$ | | | |

-continued

| | | | |
|---|---|---|---|
| | $d_{28} = 1.6000$ | $n_{15} = 1.61800$ | $\nu_{15} = 63.38$ |
| $r_{29} = -18.2255$ | | | |

| f | 9.1 | 24.0 | 71.7 |
|---|---|---|---|
| $D_1$ | 1.5 | 19.9393 | 29.8404 |
| $D_2$ | 18.3861 | 2.2980 | 6.7145 |
| $D_3$ | 17.8087 | 15.4575 | 1.2 | aspherical surface coefficient (14th surface)

$A_2 = 0$, $A_4 = 0.31322 \times 10^{-4}$, $A_6 = 0.11608 \times 10^{-6}$ (19th surface)

$A_2 = 0$, $A_4 = -0.40930 \times 10^{-4}$, $A_6 = -0.54779 \times 10^{-6}$ (22nd surface)

$A_2 = 0$, $A_4 = -0.74567 \times 10^{-4}$, $A_6 = 0.26627 \times 10^{-6}$ (25th surface)

$A_2 = 0$, $A_4 = 0.58984 \times 10^{-4}$, $A_6 = 0.62966 \times 10^{-6}$
$D_{2W}/D_{23W} = 1.032$, $|f_{2F}/f_W| = 2.478$, $f_1/f_W = 6.227$
$f_3/f_W = 1.806$

Embodiment 3

$f = 9.0 \sim 24.0 \sim 74.9$, F number = 2.0

| | | | |
|---|---|---|---|
| $r_1 = 403.4986$ | | | |
| | $d_1 = 2.1000$ | $n_1 = 1.84666$ | $\nu_1 = 23.88$ |
| $r_2 = 83.8074$ | | | |
| | $d_2 = 5.8200$ | $n_2 = 1.61800$ | $\nu_2 = 63.38$ |
| $r_3 = -232.5669$ | | | |
| | $d_3 = 0.1000$ | | |
| $r_4 = 63.3505$ | | | |
| | $d_4 = 4.1000$ | $n_3 = 1.49700$ | $\nu_3 = 81.61$ |
| $r_5 = -1692.5589$ | | | |
| | $d_5 = 0.1000$ | | |
| $r_6 = 35.0932$ | | | |
| | $d_6 = 4.8000$ | $n_4 = 1.49700$ | $\nu_4 = 81.61$ |
| $r_7 = 107.9306$ | | | |
| | $d_7 = D_1$ (variable) | | |
| $r_8 = -373.0576$ | | | |
| | $d_8 = 1.2000$ | $n_5 = 1.72916$ | $\nu_5 = 54.68$ |
| $r_9 = 12.7013$ | | | |
| | $d_9 = 4.7751$ | | |
| $r_{10} = -44.6535$ | | | |
| | $d_{10} = 1.2000$ | $n_6 = 1.74100$ | $\nu_6 = 52.68$ |
| $r_{11} = 66.8377$ | | | |
| | $d_{11} = 0.1000$ | | |
| $r_{12} = 23.8103$ | | | |
| | $d_{12} = 2.3000$ | $n_7 = 1.80518$ | $\nu_7 = 25.43$ |
| $r_{13} = -240.8486$ | | | |
| | $d_{13} = D_2$ (variable) | | |
| $r_{14} = -45.4237$ (aspherical surface) | | | |
| | $d_{14} = 1.2000$ | $n_8 = 1.7916$ | $\nu_8 = 54.68$ |
| $r_{15} = 26.0782$ | | | |
| | $d_{15} = 1.6000$ | $n_9 = 1.75520$ | $\nu_9 = 27.51$ |
| $r_{16} = 56.5259$ | | | |
| | $d_{16} = D_3$ (variable) | | |
| $r_{17} = $ stop | | | |
| | $d_{17} = 1.000$ | | |
| $r_{18} = 16.1803$ (aspherical surface) | | | |
| | $d_{18} = 2.8000$ | $n_{10} = 1.61800$ | $\nu_{10} = 63.38$ |
| $r_{19} = -329.1617$ | | | |
| | $d_{19} = 0.1000$ | | |
| $r_{20} = 14.0395$ | | | |

-continued

| | $d_{20} = 4.1770$ | $n_{11} = 1.65160$ | $v_{11} = 58.52$ |
|---|---|---|---|
| $r_{21} = 39.1906$ | | | |
| | $d_{21} = 0.8000$ | $n_{12} = 1.68893$ | $v_{12} = 31.08$ |
| $r_{22} = 13.6452$ | | | |
| | $d_{22} = 0.5176$ | | |
| $r_{23} = 15.3523$ | | | |
| | $d_{23} = 3.9381$ | $n_{13} = 1.65160$ | $v_{13} = 58.52$ |
| $r_{24} = 308.9664$ | | | |
| | $d_{24} = 0.3994$ | | |
| $r_{25} = -44.3779$ | | | |
| | $d_{25} = 1.0040$ | $n_{14} = 1.78470$ | $v_{14} = 26.22$ |
| $r_{26} = 12.1916$ (ashperical surface) | | | |
| | $d_{26} = 2.5836$ | | |
| $r_{27} = 40.6779$ | | | |
| | $d_{27} = 1.8000$ | $n_{15} = 1.74400$ | $v_{15} = 44.73$ |
| $r_{28} = -20.4704$ | | | |

| f | 9.0 | 24.0 | 71.9 |
|---|---|---|---|
| $D_1$ | 1.4 | 18.3336 | 26.4559 |
| $D_2$ | 16.3007 | 3.1548 | 12.6977 |
| $D_3$ | 22.4529 | 18.6652 | 1.0 | aspherical surface coefficients (14th surface)

$A_2 = 0$,    $A_4 = 0.83612 \times 10^{-5}$,    $A_6 = 0.13128 \times 10^{-7}$ (18th surface)

$A_2 = 0$,    $A_4 = -0.18313 \times 10^{-4}$,    $A_6 = -0.45662 \times 10^{-7}$ (26th surface)

$A_2 = 0$,    $A_4 = 0.17010 \times 10^{-3}$,    $A_6 = 0.75527 \times 10^{-7}$
$D_{2W}/D_{23W} = 0.726$, $|f_{2F}/f_W| = 2.459$, $f_1/f_W = 5.618$
$f_3/f_W = 1.960$ Embodiment 4

| f = 9.1~24.0~70.9, F number = 2.0 | | | |
|---|---|---|---|
| $r_1 = 114.0114$ | | | |
| | $d_1 = 1.9000$ | $n_1 = 1.8466$ | $v_1 = 23.78$ |
| $r_2 = 59.6438$ | | | |
| | $d_2 = 6.0000$ | $n_2 = 1.49700$ | $v_2 = 81.61$ |
| $r_3 = -1072.3002$ | | | |
| | $d_3 = 0.1000$ | | |
| $r_4 = 53.6706$ | | | |
| | $d_4 = 5.2000$ | $n_3 = 1.49700$ | $v_3 = 81.61$ |
| $r_5 = 1760.6009$ | | | |
| | $d_5 = 0.1000$ | | |
| $r_6 = 32.7539$ | | | |
| | $d_6 = 4.4000$ | $n_4 = 1.49700$ | $v_4 = 81.61$ |
| $r_7 = 81.9914$ | | | |
| | $d_7 = D_1$ (variable) | | |
| $r_8 = 81.4003$ | | | |
| | $d_8 = 1.0000$ | $n_5 = 1.72916$ | $v_5 = 54.68$ |
| $r_9 = 9.7781$ | | | |
| | $d_9 = 4.5519$ | | |
| $r_{10} = -38.8252$ | | | |
| | $d_{10} = 1.0000$ | $n_6 = 1.72916$ | $v_6 = 54.68$ |
| $r_{11} = 41.1005$ | | | |
| | $d_{11} = 0.2000$ | | |
| $r_{12} = 18.5000$ | | | |
| | $d_{12} = 2.9000$ | $n_7 = 1.84666$ | $v_7 = 23.78$ |
| $r_{13} = 232.5433$ | | | |
| | $d_{13} = D_2$ (variable) | | |
| $r_{14} = -113.8503$ | | | |
| | $d_{14} = 1.0000$ | $n_8 = 1.49700$ | $v_8 = 81.61$ |
| $r_{15} = 78.5774$ | | | |
| | $d_{15} = 1.1000$ | | |
| $r_{16} = -37.0605$ | | | |
| | $d_{16} = 1.0000$ | $n_9 = 1.61800$ | $v_8 = 63.38$ |

-continued

| $r_{17} = -185.2564$ | | | |
|---|---|---|---|
| | $d_{17} = D_3$ (variable) | | |
| $r_{18}$ = stop | | | |
| | $d_{18} = 1.0000$ | | |
| $r_{19} = 14.2786$ | | | |
| | $d_{19} = 4.0000$ | $n_{10} = 1.61800$ | $v_{10} = 63.38$ |
| $r_{20} = -28.9138$ | | | |
| | $d_{20} = 0.9000$ | $n_{11} = 1.71736$ | $v_{11} = 29.51$ |
| $r_{21} = 60.0357$ | | | |
| | $d_{21} = 0.2000$ | | |
| $r_{22} = 14.9076$ (ashperical surface) | | | |
| | $d_{22} = 2.4000$ | $n_{12} = 1.61800$ | $v_{12} = 63.38$ |
| $r_{23} = -100.6330$ | | | |
| | $d_{23} = 4.5940$ | | |
| $r_{24} = 19.3938$ | | | |
| | $d_{24} = 1.3000$ | $n_{13} = 1.72047$ | $v_{13} = 34.72$ |
| $r_{25} = 7.1423$ (ashperical surface) | | | |
| | $d_{25} = 5.4870$ | | |
| $r_{26} = 12.3482$ | | | |
| | $d_{26} = 12.3482$ | $n_{14} = 1.65160$ | $v_{14} = 58.52$ |
| $r_{27} = 57.8228$ | | | |

| f | 9.1 | 24.0 | 70.9 |
|---|---|---|---|
| $D_1$ | 1.5 | 17.5126 | 26.0196 |
| $D_2$ | 16.7751 | 2.4695 | 10.4032 |
| $D_3$ | 19.3268 | 17.6197 | 1.2 | aspherical surface coefficients (22th surface)

$A_2 = 0$,    $A_4 = -0.95827 \times 10^{-4}$,    $A_6 = -0.42545 \times 10^{-6}$
$A_8 = 0.77114 \times 10^{-10}$ (25th surface)

$A_2 = 0$,    $A_4 = -0.14953 \times 10^{-4}$,    $A_6 = -0.19812 \times 10^{-5}$
$A_8 = -0.54445 \times 10^{-8}$ $D_{2W}/D_{23W} = 0.868$, $|f_{2F}/f_W| = 1.952$, $f_1/f_W = 5.474$
$f_3/f_W = 2.026$ wherein the reference symbols $r_1, r_2, \ldots$ represent radii of curvature on surfaces of respective lens elements, the reference symbols $d_1, d_2, \ldots$ designate thicknesses of the respective lens elements and airspaces reserved therebetween, the reference symbols $n_1, n_2, \ldots$ denote refractive indices of the respective lens elements and the reference symbols $v_1, v_2, \ldots$ represent Abbe's numbers of the respective lens elements.

Figure 4:
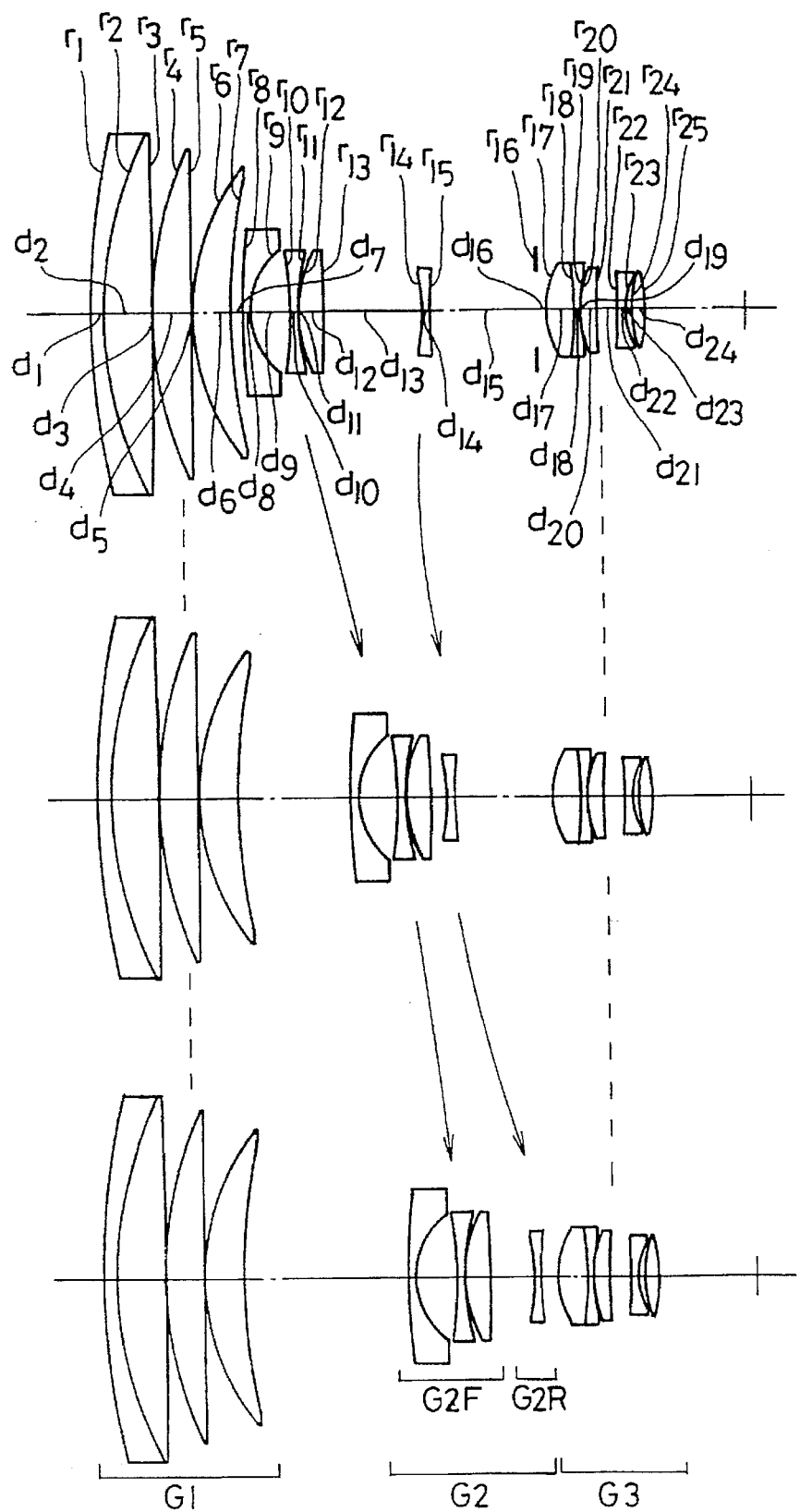
FIG. 4 shows sectional views illustrating a composition of a first embodiment of the zoom lens system according to the present invention.

The first embodiment of the present invention has the composition illustrated in FIG. 4, wherein the zoom lens system comprises, in order from the object side, a first positive lens unit $G_1$, a second negative lens unit $G_2$ and a third positive lens unit $G_3$: the second lens unit (variator) $G_2$ being composed of a negative front subunit $G_{2F}$ and a negative rear subunit $G_{2R}$: and is configured so as to perform a change of magnification and correction of a deviation of an image surface location caused by the change of magnification by moving the second lens unit $G_2$ along an optical axis while varying an airspace reserved therebetween, and to be zoomed while keeping the first lens unit $G_1$ and the third lens unit $G_3$ stationary.

Further, the first lens unit $G_1$ consists, in order fron the object side, of a negative lens element, a positive lens element, a positive lens component and a positive lens component, and has a function to converge a light bundle coming from an axial object point as well as another function to lead a light bundle coming from an offaxial object point to the second lines unit. The second lens unit consists of the front subunit $G_{2F}$ which is composed, in order from the object side, of a negative lens component, a negative lens component and a positive lens component, and the rear subunit $G_{2R}$ which is composed of a negative lens component. The third lens unit $G_3$ consists, in order from the object side, of a positive lens element, a negative lens element, a positive lens element, a negative lens element and a positive lens element, and has a function to image a diverging light bundle coming from the second lens unit $G_2$. A stop is disposed between the second lens unit and the third lens unit.

The first embodiment, which is configured so as to satisfy the conditions (1) and (2), allows to select a strong refractive power for the second lens unit $G_2$ while favorably correcting aberrations produced by this lens unit, thereby having a short total length and high optical performance including a high vari-focal ratio.

Further, the first embodiment also satisfies the condition (3) for correcting aberrations produced by the first lens unit and shortening the total length of the zoom lens system. Ordinarily, the first lens unit could hardly correct chromatic aberration at the tele position in particular at which incident rays are high on this lens unit. When th first lens unit satisfies the condition (3), however, it can correct aberrations favorably.

Furthermore, the third lens unit satisfies the condition (4) and adopts, as an object side surface of the positive lens component which is disposed at the third location as counted from the object side, an aspherical surface having such a shape as to weaken a positive refractive power as portions of the aspherical surface are farther from an optical axis toward the margin of the aspherical surface, whereby the third lens unit favorably corrects aberrations in spite of the refractive power thereof strengthened for shortening the total length of the zoom lens system preferred as the first embodiment.

Moreover, the first embodiment is configured so as to be focused on an object located at an extremely short distance by moving the rear subunit of the second lens unit toward the object side and adopts an aspherical surface as an object side surface of the rear subunit for correcting variations of aberrations caused by focusing.

When the first embodiment is focused on an object located at infinite distance, it exhibits the aberration characteristics illustratied in FIG. 8A, FIG. 8B, FIG. 8C, FIG. 8D, FIG. 8E; FIG. 9A, FIG. 9B, FIG. 9C, FIG. 9D, FIG. 9E and FIG. 10A, FIG. 10B, FIG. 10C, FIG. 10D, FIG. 10E. It will be understood from these drawings that the first embodiment of the present invention has high optical performance.

In addition, the reference symbols W, S and T which are used in FIG. 4 represent compositions of the first embodiment at the wide position, an intermediate focal length and the tele position respectively.

Figure 5:
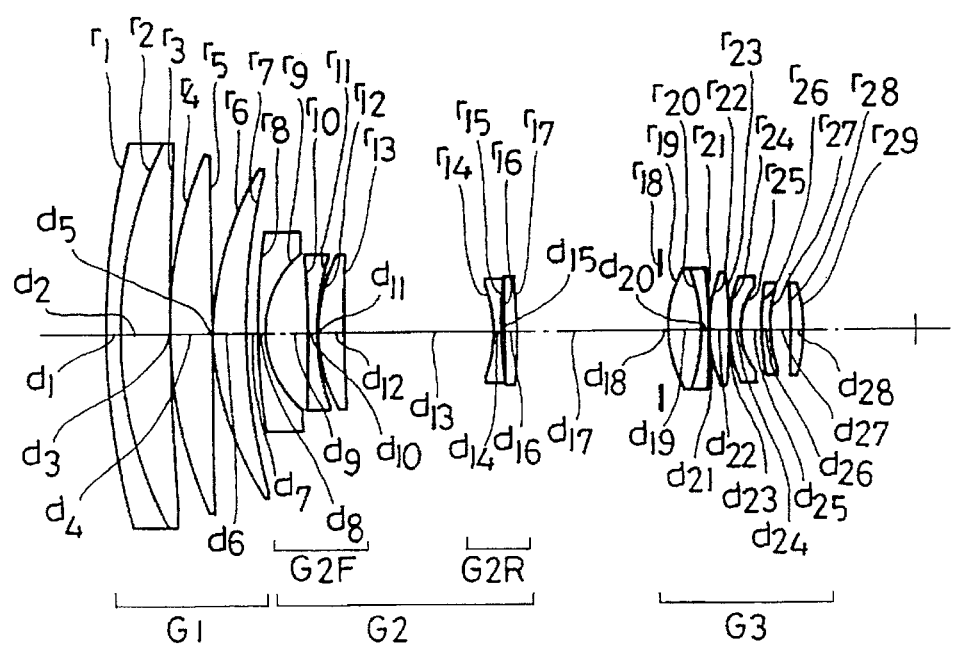
FIG. 5 shows a sectional view illustrating a composition of a second embodiment of the zoom lens system according to the present invention.

The second embodiment of the present invention has the composition illustrated in FIG. 5. This embodiment consists of a first positive lens unit $G_1$, a second negative lens unit $G_2$ and a third positive lens unit $G_3$: the second lens unit $G_2$ being composed of a negative front subunit $G_{2F}$ and a negative rear subunit $G_{2R}$ having fundamental functions which are substantially the same as those of the front subunit and the rear subunit of the second lens unit used in the first embodiment.

Further, the first lens unit $G_1$ has a composition similar to that of the first lens unit adopted for the first embodiment, whereas the second lens unit of the second embodiment consists of the front subunit $G_{2F}$ which is composed, in order from the object side, of a negative lens component, a negative lens component and a positive lens component, and the rear subunit $G_{2R}$ which is composed of a negative lens component and a positive lens component; and the third lens unit $G_3$ is composed, in order from the object side, of a positive lens component, a negative lens component, a positive lens component, a negative lens component, a negative lens component and a positive lens component; and a stop is disposed between the second lens unit $G_2$ and the third lens unit $G_3$.

Though the second embodiment is configured so as to have a vari-focal ratio of 8 which is higher than that of the first embodiment, the second embodiment is compact and has not only the high vari-focal ratio but also high optical performance owing to the fact that the second lens unit $G_2$ is composed of the front subunit $G_{2F}$ and the rear subunit $G_{2R}$ having the negative refractive powers and another fact that the second lens unit $G_2$ is configured so as to satisfy the conditions (1)and (2), and therefore has a strong refractive power while favorably correcting aberrations.

Furthermore, the second embodiment is configured so as to satisfy the condition (3) so that the first lens unit has a refractive power suited for shortening a total length of the zoom lens system and favorably correcting aberrations therein.

The second embodiment satisfies the condition (4) and adopts, as an object side surface of the positive lens component disposed on the most object side in the third lens unit $G_3$, an aspherical surface having such a shape as to weaken a positive refractive power as portions of the aspherical surface are farther from the optical axis toward the margin thereof, thereby being capable of favorably correcting aberrations though the zoom lens system has a total length shortened by strengthening a refractive power.

When the second embodiment is focused on the object located at the infinite distance, it exhibits the aberration characteristics illustrated in FIG. 11A, FIG. 11B, FIG. 11C, FIG. 11D, FIG. 11E; FIG. 12A, FIG. 12B, FIG. 12C, FIG. 12D, FIG. 12E and FIG. 13A, FIG. 13B, FIG. 13C, FIG. 13D, FIG. 13E, and it will be seen from these drawings that the second embodiment of the present invention has high optical performance.

Figure 6:
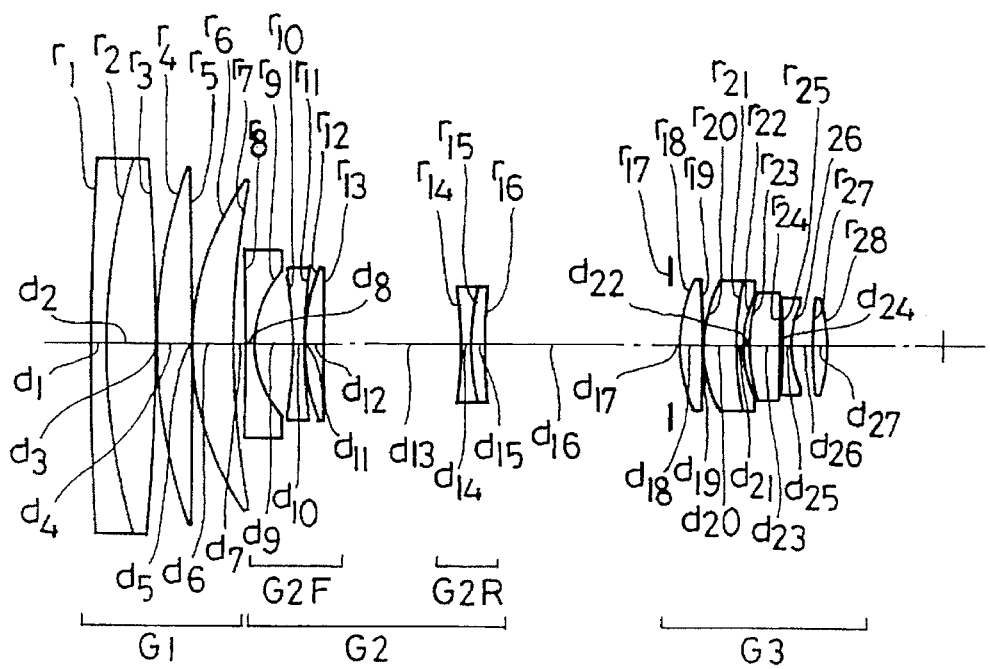
FIG. 6 shows a sectional view illustrating a composition of a third embodiment of the zoom lens systme according to the present invention.

The third embodiment of the present invention has the composition illustrated in FIG. 6, wherein a zoom lens system comprises a first positive lens unit $G_1$, a second negative lens unit $G_2$ and a third positive lens unit $G_3$: the second lens unit $G_2$ being composed of a negative front subunit $G_{2F}$ and a negative rear subunit $G_{2R}$ which have functions similar to those of the front subunit and the rear subunit of the second lens unit used in the first embodiment.

Though the first lens unit $G_1$ of the third embodiment has a composition similar to that of the first lens unit used in the first embodiment, the second lens unit $G_2$ of the third embodiment is composed of a front subunit $G_{2F}$ which consists, in order from the object side, of a negative lens component, a negative lens component and a positive lens component, and a rear subunit $G_{2R}$ which consists of a cemented doublet composed of a negative lens element and a positive lens element, whereas the third lens unit consists, in order from the object side, of a positive lens component, a positive lens component, a negative lens component, a positive lens component, a negative lens component and a positive lens component. Further, a stop is disposed between the second lens unit and the third lens unit.

The third embodiment can provide effects similar to those obtained by the second embodiment owing to a fact that the third embodiment uses the second lens unit $G_2$ composed of the negative front subunit $G_{2F}$ and the negative rear subunit $G_{2R}$, is configured so as to satisfy the conditions (1), (2), (3) and (4), and adopts, as an object side surface of the positive lens component disposed on the object side in the third lens unit $G_3$, and aspherical surface having such a shape as to weaken a positive refractive power as portions of the aspherical surface are farther from the optical axis toward the margin thereof.

In the third embodiment, the rear subunit $G_{2R}$ of the second lens unit used as the variator is configured as a cemented doublet consisting of the negative lens element and the positive lens element for favorably correcting chromatic aberration produced by the rear subunit $G_{2R}$ of the second lens unit.

The third embodiment of the present invention has high optical performance as is understood from the aberration characteristics thereof in conditions where it is focused on the object located at infinited distance which are illustrated in FIG. 14A, FIG. 14B, FIG. 14C, FIG. 14D, FIG. 14E; FIG. 15A, FIG. 15B, FIG. 15C, FIG. 15D, FIG. 15E and FIG. 16A, FIG. 16B, FIG. 16C, FIG. 16D, FIG. 16E.

Figure 7:
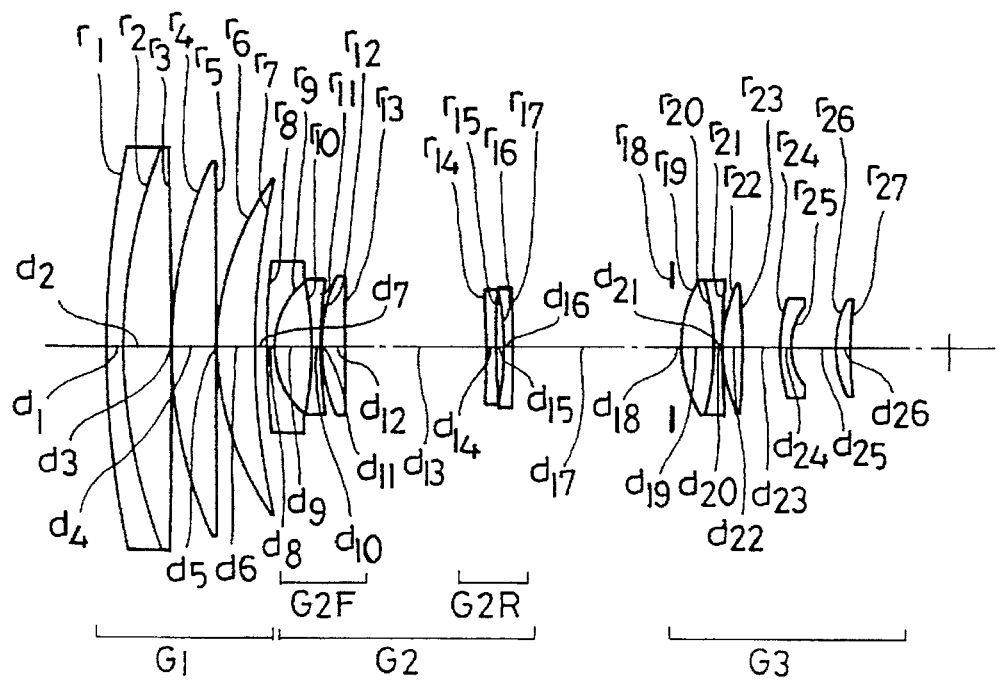
FIG. 7 shows a sectional view illustrating a composition of a fourth embodiment of the zoom lens system according to the present invention.
Figure 8A:
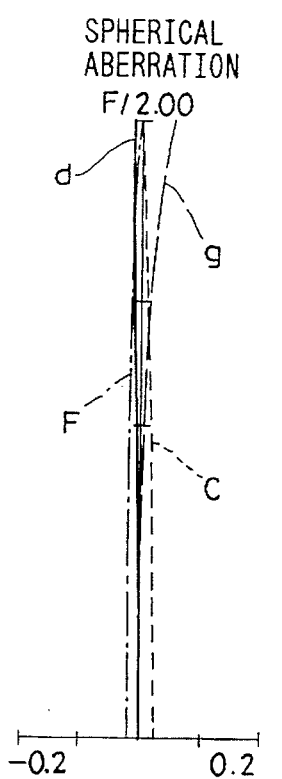
FIG. 8A, FIG. 8B, FIG. 8C, FIG. 8D and FIG. 8E show graphs visualizing aberration characteristics of the first embodiment of the present invention when it is focused on an object located at infinite distance at a wide position thereof.
Figure 8B:
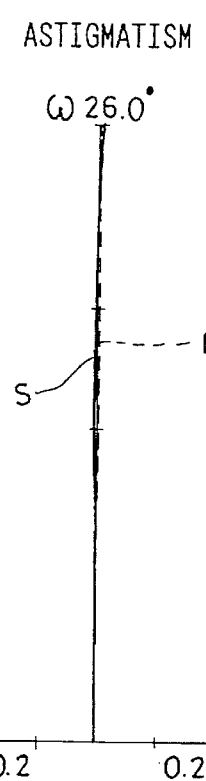
Figure 8C:
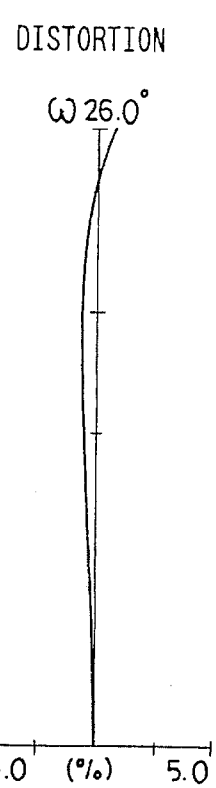
Figure 8D:
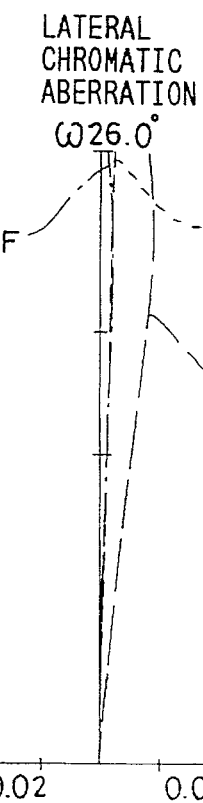
Figure 8E:
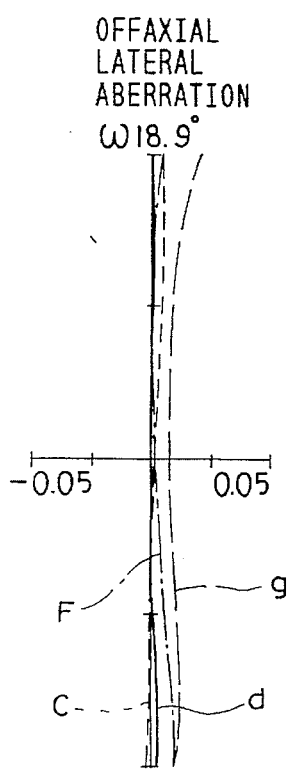
Figure 9A:
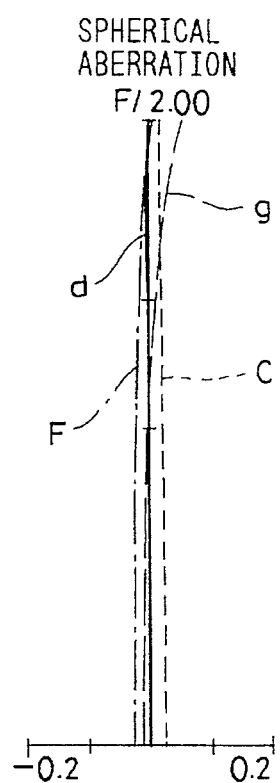
FIG. 9A, FIG. 9B, FIG. 9C, FIG. 9D and FIG. 9E show graphs visualizing aberration characteristics of the first embodiment of the present invention when it is focused on the object located at infinite distance at an intermediate focal length thereof.
Figure 9B:
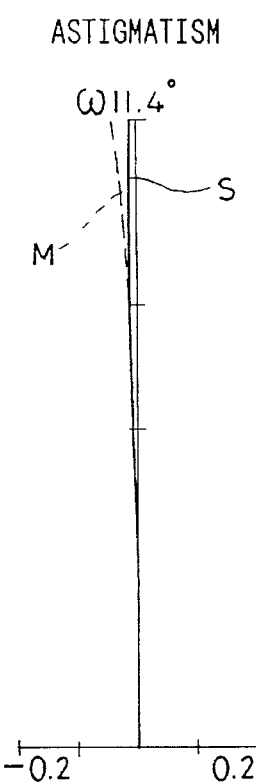
Figure 9C:
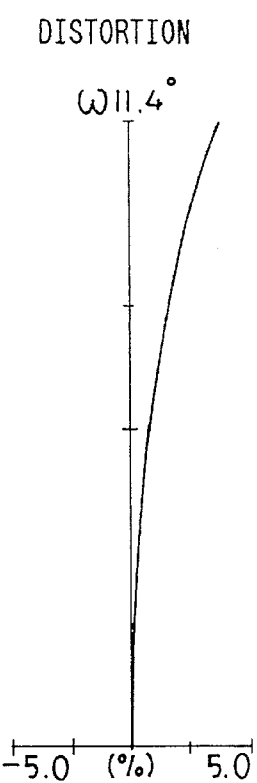
Figure 9D:
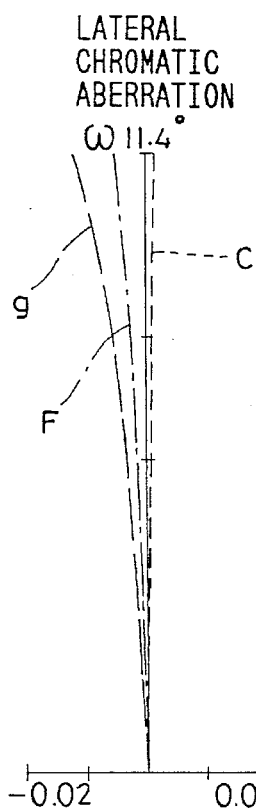
Figure 9E:
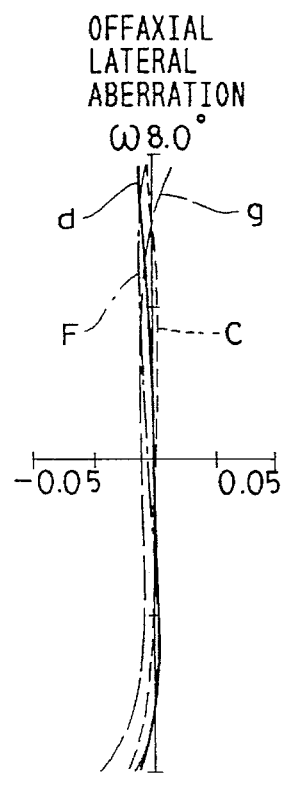
Figure 10A:
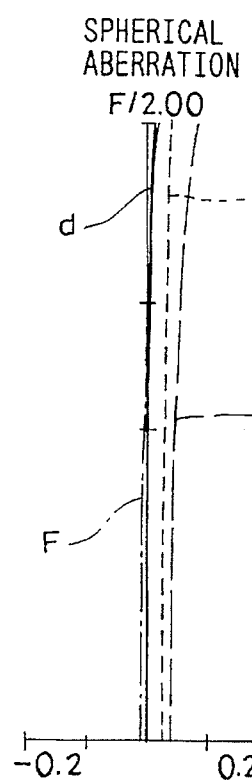
FIG. 10A, FIG. 10B, FIG. 10C, FIG. 10D and FIG. 10E show graphs visualizing aberration characteristics of the first embodiment of the present invention when it is focused on the object located at infinite distance at a tele position thereof.
Figure 10B:
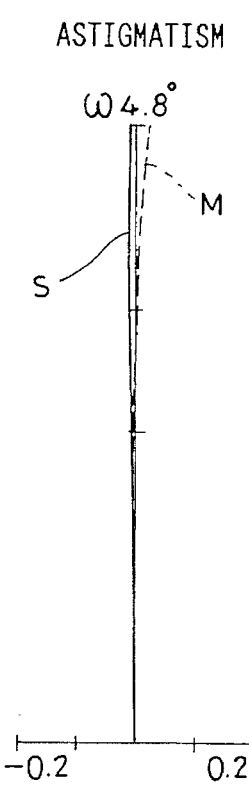
Figure 10C:
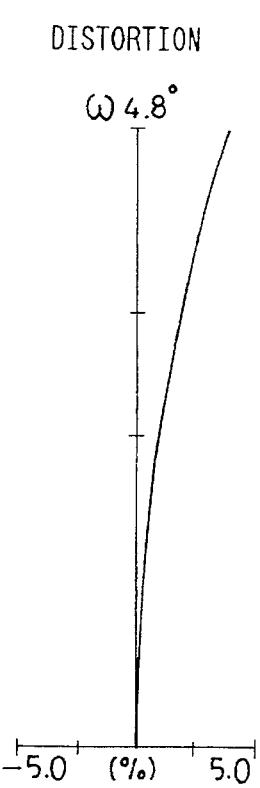
Figure 10D:
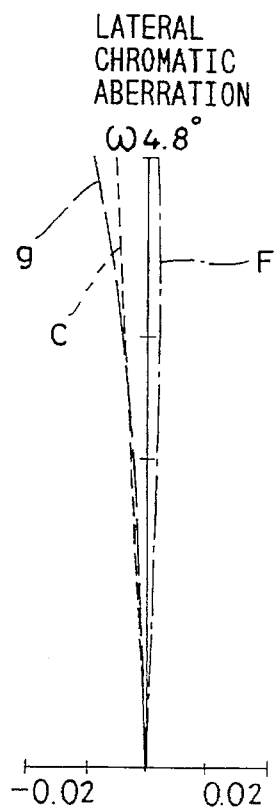
Figure 10E:
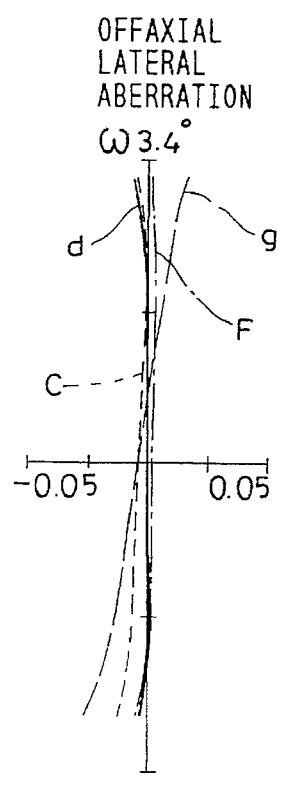
Figure 14A:
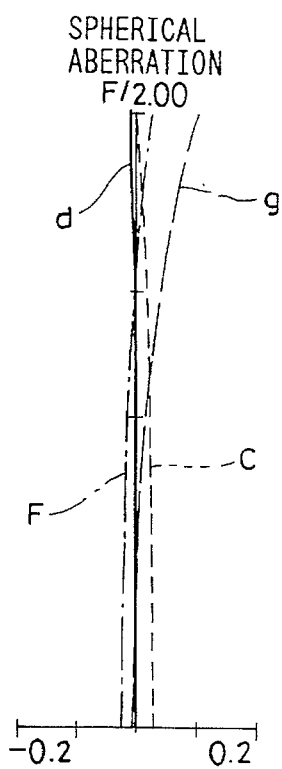
FIG. 14A, FIG. 14B, FIG. 14C, FIG. 14D and FIG. 14E show graphs visualizing aberration characteristics of a third embodiment of the present invention when it is focused on the object located at infinite distance at the wide position thereof.
Figure 14B:
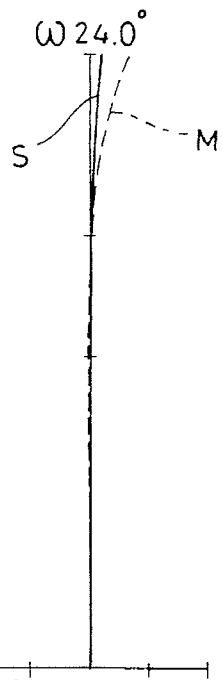
Figure 14C:
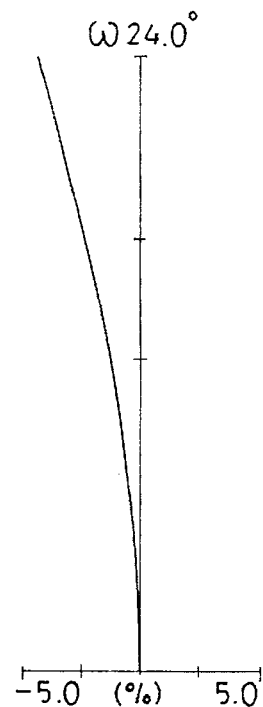
Figure 14D:
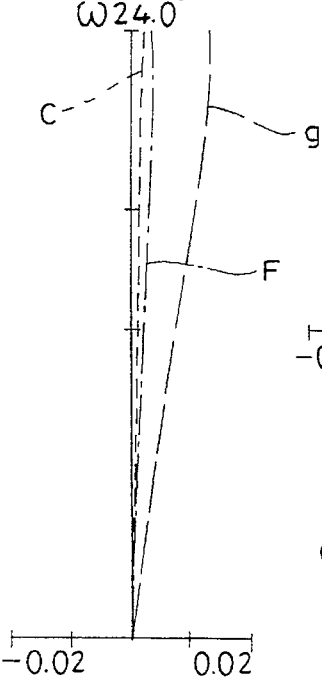
Figure 14E:
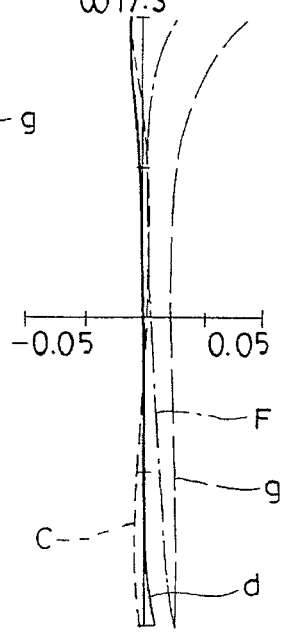

The fourth embodiment of the present invention has the composition illustrated in FIG. 7, wherein a zoom lens system comprises a first positive lens unit, a second negative lens unit and a third positive lens unit: the second lens unit being composed of a negative front subunit $G_{2F}$ and a rear negative subunit $G_{2R}$ having functions similar to those of the front subunit and the rear subunit of the second lens unit used in each of the embodiments described above.

In the fourth embodiment of the present invention, the first lens unit $G_1$ has a composition similar to that of the first lens unit used in the first embodiment, whereas the second lens unit $G_2$ consists of the front subunit $G_{2F}$ which is composed, in order from the object side, of a negative lens component, a negative lens component and a positive lens component, and the rear subunit $G_{2R}$ which is composed of a negative lens component and a negative lens component; and the third lens unit consists, in order from the object side, of a positive lens component, a negative lens component, a positive lens continent, a negative lens component and a positive lens component. Further, a stop is disposed between the second lens unit $G_2$ and the third lens unit $G_3$.

The fourth embodiment is configured so as to provide effects which are similar to those obtained with the first embodiment by composing the second lens unit $G_2$ of the negative front subunit $G_{2F}$ and the rear subunit $G_{2R}$, configuring the zoom lens system so as to satisfy the conditions (1), (2), (3) and (4), and adopting, as an object side surface of the positive lens component which is disposed at the third location as counted from the object side in the third lens unit $G_3$, an aspherical surface having such a shape as to wasken a positive refractive power as portions of the aspherical surface are farther from the optical axis toward the magin of the aspherical surface.

Further, the fourth embodiment is configured so as to favorably correct not only monochromatic aberrations such as spherical aberration produced by the second lens unit $G_2$ owing to the fact that the second lens unit $G_2$ used as the variator comprises the rear subunit $G_{2R}$ composed of the two negative lens components, but also chromatic aberration by adopting a glass material having a low dispersion characteristic for the negative lens components.

When the fourth embodiment is focused on the object located at the infinite distance, it has the aberration characteristics illustrated in FIG. 17A, FIG. 17B, FIG. 17C, FIG. 17D, FIG. 17E, FIG. 18A, FIG. 18B, FIG. 18C, FIG. 18D, FIG. 18E and FIG. 19A, FIG. 19B, FIG. 19C, FIG. 19D, FIG. 19E. As is seen from these drawings, the fourth embodiment of the present invention is a zoom lens system having high optical performance.

The zoom lens system according to the present invention is a compact zoom lens system which has high optical performance and a high vari-focal ratio, and is suited for use with video cameras, still cameras and so on.

I claim:

1. A zoom lens system comprising in order from the object side: a first lens unit having a positive refractive power, a second lens unit having a negative refractive power, and at least one additional lens unit disposed immediately after said second lens unit;

wherein said first lens unit comprises at least three positive lens elements and at least one negative lens element, wherein said second lens unit consists essentially of a front subunit having a negative refractive power and a rear subunit having a negative refractive power, wherein said lens system is constructed and arranged to be capable of zooming, and wherein a deviation of an image location caused by said zooming is corrected by moving said second lens unit while varying a distance between said front subunit and said rear subunit, said front subunit comprising at least one positive lens element and at least two negative lens elements, and wherein said zoom lens system satisfies the following conditions:

$$0.1 < D_{2W}/D_{23W} < 2.0$$

and $4.0 < f_1/f_W < 8.0$ wherein the reference symbol $D_{2W}$ represents the distance between the front subunit and the rear subunit of said second lens unit at a wide position of said zoom lens system, the reference symbol $D_{23W}$ represents a distance between said second lens unit and the at least one additional lens unit disposed immediately after said second lens unit, the reference symbol $f_1$ represents a focal length of said first lens unit, and the reference symbol $f_w$ represents a focal length of said lens system as a whole at said wide position of the zoom lens system.

2. A zoom lens system according to claim 1 further satisfying the following condition:

$$1.8 < |f_{2F}|/f_W < 4.0$$

wherein the reference symbol $f_{2F}$ represents a focal length of the front subunit of said second lens unit.

3. A zoom lens system comprising in order from the object side: a first lens unit which has a positive refractive power and is to be stationary for zooming said lens system, a second lens unit which has a negative refractive power and is movable for zooming said lens system, and a third lens unit which has a positive refractive power and is to be stationary for zooming said lens system; wherein said first lens unit comprises at least three positive lens elements and at least one negative lens element, wherein said second lens unit is composed of a front subunit having a negative refractive power and a rear subunit having a negative refractive power, wherein the front subunit of said second lens unit comprises at least one positive lens element and at least two negative lens elements, and the rear subunit of said second lens unit comprises at least one negative lens element, wherein a distance between said front subunit and said rear subunit is varied for correcting a deviation of an image location while said second lens unit is moved for zooming said lens system, and wherein said zoom lens system is configured so as to satisfy the following conditions (1), (2) and (3):

$$0.1 < D_{2W}/D_{23W} < 2.0 \quad (1)$$

$$1.8 < |f_{2F}/f_W| < 4.0 \quad (2)$$

$$4.0 < f_1/f_W < 8.0 \quad (3)$$

wherein the reference symbol $D_{2W}$ represents the distance between the front subunit and the rear subunit of said second lens unit, the reference symbol $D_{23W}$ represents a distance between said second lens unit and said third lens unit at a wide position of said zoom lens system, the reference symbol $f_{2F}$ represents a focal length of the front subunit of said second lens unit, the reference symbol $f_1$ represents a local length of said first lens unit, and the reference symbol $f_W$ represents a focal length of said zoom lens as a whole at the wide position of said zoom lens system.

4. A zoom lens system according to claim 3 wherein said third lens unit comprises at least one aspherical surface which has such a shape as to progressively weaken a positive refractive power as portions of said aspherical surface are farther from an optical axis toward the margin thereof.

5. A zoom lens system according to claim 3 wherein the rear subunit of said second lens unit consists only of a single negative lens element.

6. A zoom lens system according to claim 3 wherein the rear subunit of said second lens unit consists of a cemented doublet consisting of a negative lens element and a positive lens element.

7. A zoom lens system according to claim 3 wherein the rear subunit of said second lens unit consists of two negative lens elements.

8. A zoom lens system according to claim 5 wherein an aspherical surface is disposed on the rear subunit of said second lens unit.

9. A zoom lens system comprising in order from the object side: a first lens unit having a positive refractive power, a second lens unit having a negative refractive power and a third lens unit having a positive refractive power;

said first lens unit having at least three positive lens elements and at least one negative lens element, said second lens unit consisting essentially of a front subunit having a negative refractive power and a rear subunit having a negative refractive power;

said lens system being constructed and arranged to be capable of zooming, and wherein a deviation of an image location caused by said zooming can be corrected by moving said second lens unit while varying a distance between said front subunit and said rear subunit of said second lens unit, said front subunit comprising at least one positive lens element and at least two negative lens elements, said third lens unit being stationary during said zooming of said lens system, and wherein said zoom lens system satisfies the following conditions:

$$0.1 < D_{23W}/D_{23W} < 2.0 \quad (1)$$

$$1.8 < f_{2F}/f_W < 4.0 \quad (2)$$

$$4.0 < f_1/f_W < 8.0 \quad (3)$$

wherein the reference symbol $D_{2W}$ represents the distance between the front subunit and the rear subunit of said second lens unit at a wide position of said zoom lens system, the reference symbol $D_{2W}$ represents a distance between said second lens unit and the third lens unit, the reference symbol $f_{2F}$ represents a focal length of the front subunit of said second lens unit, the reference symbol $f_1$ represents a focal length of said first lens unit, and the reference symbol $f_1$ designates a focal length of said zoom lens system as a whole at a wide position thereof.

10. A zoom lens system comprising in order from the object side:

a first lens unit which has a positive refractive power and is to be stationary for zooming said lens system, a second lens unit which has a negative refractive power and is movable for zooming said lens system, and a third lens unit which has a positive refractive power and is to be stationary for zooming said lens system;

said second lens unit comprising a front subunit having a negative refractive power and a rear subunit having a negative refractive power;

wherein a distance between said front subunit and said rear subunit, of said second lens unit is varied for correcting a deviation of an image location while said second lens unit is moved for zooming said lens system, and wherein said zoom lens system is configured so as to satisfy the following conditions:

$$0.1 < D_{2W}/D_{23W} < 2.0 \quad (1)$$

$$1.8 < |f_{2F}/f_W| < 4.0 \quad (2)$$

$$4.0 < f_1/f_W < 8.0 \quad (3)$$

$$1.4 < f_3/f_W < 2.3 \quad (4)$$

wherein the reference symbol $D_{2W}$ represents a distance between the front subunit and the rear subunit of said second lens unit, the reference symbol $D_{23W}$ represents a distance between said second lens unit and said third lens unit at a wide position of said zoom lens system, the reference symbol $f_{2F}$ represents a focal length of the front subunit of said second lens unit, the reference symbol $f_1$ represents a focal length of said first lens unit, the reference symbol $f_W$ represents a focal length of said zoom lens system as a whole at the wide position of the zoom lens system, and the reference symbol $f_3$ represents a focal length of said third lens unit.

11. A zoom lens system according to claim 9, further satisfying the following condition:

$$1.4 < f_3/f_W < 2.3 \quad (4)$$

wherein the reference symbol $f_3$ represents a focal length of said third lens unit.

12. A zoom lens system according to claim 10 or 11 wherein said third lens unit comprises at least one aspherical surface which has such a shape as to progressively weaken a positive refractive power as portions of said aspherical surface are disposed farther from an optical axis toward a margin thereof.

13. A zoom lens system comprising in order from the object side: a first lens unit having a positive refractive power, a second lens unit having a negative refractive power, and at least one additional lens unit disposed immediately after said second lens unit;

wherein said first lens unit comprises at least three positive lens elements and at least one negative lens element, wherein said second lens unit consists essentially of a front subunit having a negative refractive power and a rear subunit having a negative refractive power, wherein said lens system is constructed and arranged to be capable of zooming, and wherein a deviation of an image location caused by said zooming is corrected by moving said second lens unit while varying a distance between said front subunit and said rear subunit, wherein said front subunit comprises at least one positive lens element and at least two negative lens elements, wherein said lens system is focused by moving the rear subunit of the second lens unit along the optical axis, and wherein said zoom lens system satisfies the following conditions:

$$0.1 < D_{2W}/D_{23W} < 2.0$$

and $$4.0 < f_1/f_W < 8.0$$

wherein the reference symbol $D_{2W}$ represents a distance between the front subunit and the rear subunit of said second lens unit at a wide position of said zoom lens system, the reference symbol $D_{23W}$ designates a distance between said second lens unit and the at least one lens unit disposed immediately after said second lens unit, the reference symbol $f_1$ represents a focal length of said first lens unit, and the reference symbol $f_W$ represents a focal length of said lens system as a whole at the wide position of the zoom lens system.

14. A zoom lens system according to claim 7, 9, 10, or 11 wherein said lens system is focused by moving the rear subunit of said second lens unit along the optical axis.

15. A zoom lens system according to claim 6, wherein an aspherical surface is disposed on the rear subunit of said second lens unit.

* * * * *